United States Patent [19]
Inbar et al.

[11] Patent Number: 6,011,528
[45] Date of Patent: *Jan. 4, 2000

[54] DISPLAY DEVICE

[75] Inventors: Dan Inbar; Hanan Wolf, both of Haifa; Ben Zion Levy, Kiryat Yam; Fran Shaffir, Haifa, all of Israel

[73] Assignee: Smartlight Ltd., Haifa, Israel

[*] Notice: This patent is subject to a terminal disclaimer.

[21] Appl. No.: 08/348,959

[22] Filed: Nov. 28, 1994

[30] Foreign Application Priority Data

Nov. 28, 1993 [IL] Israel ........................................ 107782
Dec. 15, 1993 [IL] Israel ........................................ 108037
Dec. 15, 1993 [IL] Israel ........................................ 108038

[51] Int. Cl.$^7$ .................................................. G06K 11/08
[52] U.S. Cl. ................................ 345/77; 40/361; 345/84; 345/102; 359/599
[58] Field of Search ................................ 40/361; 359/53, 359/36, 250, 251, 252, 254, 485, 488, 489, 493, 599; 345/87, 33, 34, 38, 55, 77, 78, 84, 102, 118

[56] References Cited

U.S. PATENT DOCUMENTS

| | | |
|---|---|---|
| 2,516,270 | 7/1950 | Swain . |
| 2,754,605 | 7/1956 | Berkeley . |
| 3,953,764 | 4/1976 | Miller et al. . |
| 4,060,801 | 11/1977 | Stein et al. .................... 345/38 |
| 4,335,936 | 6/1982 | Nonomura et al. . |
| 4,378,557 | 3/1983 | Murata . |
| 4,385,462 | 5/1983 | Brown ........................... 40/361 |
| 4,448,490 | 5/1984 | Shibuya et al. . |
| 4,454,904 | 6/1984 | Oxman . |

(List continued on next page.)

FOREIGN PATENT DOCUMENTS

| | | |
|---|---|---|
| 0352101 | 1/1990 | European Pat. Off. . |
| 2559923 | 8/1985 | France . |
| 3933988 | 4/1991 | Germany . |
| 2050032 | 12/1980 | United Kingdom . |
| 2062930 | 5/1981 | United Kingdom . |
| 91/10152 | 7/1991 | WIPO . |
| 9110152 | 7/1991 | WIPO . |
| 93/01564 | 1/1993 | WIPO . |
| 9301564 | 1/1993 | WIPO . |

OTHER PUBLICATIONS

Abildgaard et al., "Increasing Contrast When Viewing Radiograpic Images", Radiology, vol. 185, pp. 475–478, 1992.
Jameson et al. "Visual Psychophysics", 1972 pp. VII, VIII and 84–101.
Patent Abstracts of Japan, vol. 17, No. 464 (P1599).
E. Kaneko, "Liquid Crystal TV Displays: Principles and Applications of Liquid Crystal Displays", pp. 77–137.
T.N. Ruckmongathan et al., Japan Display 1992, "S3–4 New Addressing Technique for Fast Responding STN LCDs", pp. 65–68.

(List continued on next page.)

*Primary Examiner*—Jeffery Brier
*Assistant Examiner*—Vincent E. Kovalick
*Attorney, Agent, or Firm*—Greenblum & Bernstein, p.L.C.

[57] ABSTRACT

A transparency viewing device including a faceplate adapted for mounting at least one transparency thereon, a passive matrix LCD array comprising a plurality of row electrodes and a plurality of column electrodes separated by liquid crystal material, one of said plurality of electrodes having N electrodes and the other of said plurality of electrodes having M electrodes whereby the intersections of the row and column electrodes define a matrix of M×N pixel elements arranged in rows and columns, which pixels are excited by an RMS voltage difference between the two electrodes intersecting a pixel and a driver which electrifies the row and column electrodes such that at least one of a plurality n of the N electrodes or a plurality m of the M electrodes are identically electrified, wherein $n \leq N$ and $m \leq M$.

114 Claims, 18 Drawing Sheets

U.S. PATENT DOCUMENTS

| | | | |
|---|---|---|---|
| 4,679,910 | 7/1987 | Efron et al. | 349/30 |
| 4,847,606 | 7/1989 | Beiswenger | 345/175 |
| 4,859,037 | 8/1989 | Iwashita et al. . | |
| 4,872,059 | 10/1989 | Shinabe | 348/793 |
| 4,936,656 | 6/1990 | Anderson et al. | 349/64 |
| 4,936,659 | 6/1990 | Anderson et al. | 350/339 |
| 4,952,036 | 8/1990 | Gulick et al. . | |
| 5,124,818 | 6/1992 | Conner et al. | 349/75 |
| 5,128,782 | 7/1992 | Wood | 309/48 |
| 5,136,282 | 8/1992 | Inaba et al. | 345/97 |
| 5,151,803 | 9/1992 | Wakita et al. | 345/97 |
| 5,307,188 | 4/1994 | Dingwall et al. | 359/53 |
| 5,329,388 | 7/1994 | Yoshimizu | 345/63 |
| 5,430,964 | 7/1995 | Inbar et al. | 40/361 |
| 5,491,332 | 2/1996 | Inabar et al. | 250/221 |

OTHER PUBLICATIONS

P.M. Alt et al., IEEE Transactions on Electron Devices vol. Ed–21, No. 2, Feb. 1974, pp. 146–155.

K. Tarumi et al., Japan Display 1992, "S15–5 On the Relationship between the Material Parameters and the Switching Dynamics in Twisted Nematic Liquid Crystals", pp. 587–590.

Patent Abstracts of Japan, vol. 10, No. 206 (P–478), Jul. 18, 1986 of JP 61–046930 to Ricoh Co., Ltd.

Patent Abstracts of Japan, vol. 16, No. 562 (P–1456), Dec. 3, 1992 of JP 42–14532 to Matsushita Electric Ind Co.

Patent Abstracts of Japan, vol. 17, No. 387 (P–1576), Jul. 20, 1993 of JP 50–66403 to Hitachi Ltd.

Nehring et al., IEEE Transactions on Electron Devices, vol. ED–26, No. 5, May 1979, pp. 795–802.

T.N. Ruckmongathan, Conference Record of the 1988 International Display Research Conference, Papers presented at Hyatt Islandia, San Diego, California, Oct. 4–6, 1988, pp. 80–85.

H. Hamada et al., 1992 SID International Symposium, Digest of Technical Papers, First Edition, May 1992, pp. 269–272. "15.2: Brightness Enhancement of an LCD Projector by a Planar Microlens Array."

IBM Technical Disclosure Bulletin, vol. 33, No. 9, Feb. 1991, High Efficiency Back Light for LCD, pp. 261–262.

D.P. Carmody et al., "Global and Segmented Search for Lung Nodules of Different Edge Gradients", Investigative Radiology, May–Jun. 1980, vol. 15, No. 3, pp. 224–233.

"Ultimate Limits for Matrix Addressing of RMS–Responding Liquid–Crystal Displays," J. Nehring et al., *IEEE Transactions on Electron Devices,* vol. ED–26, No. 5, May 1979.

FIG. 3
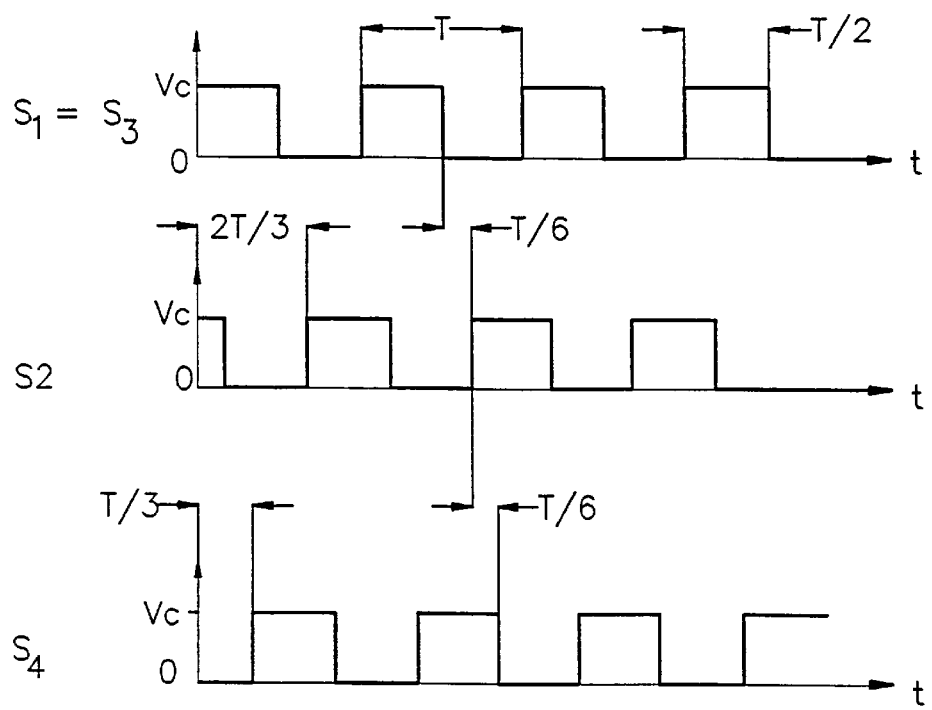
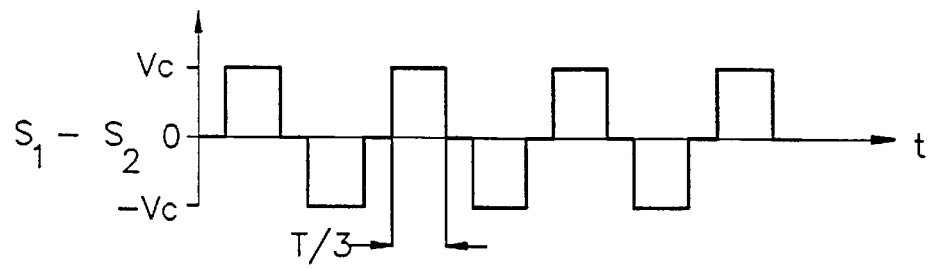
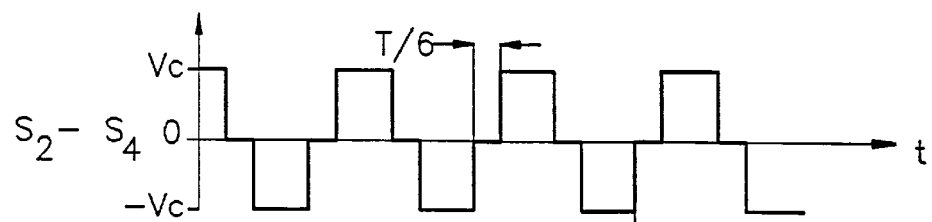
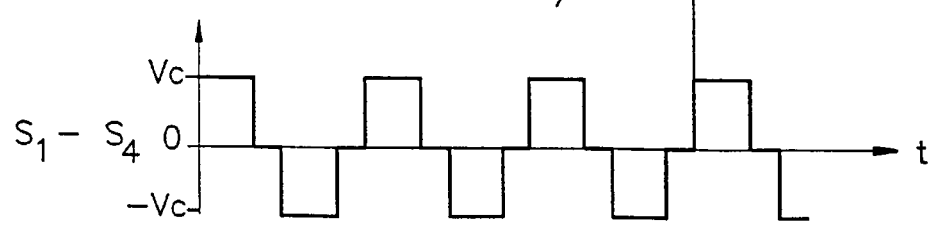

FIG. 5
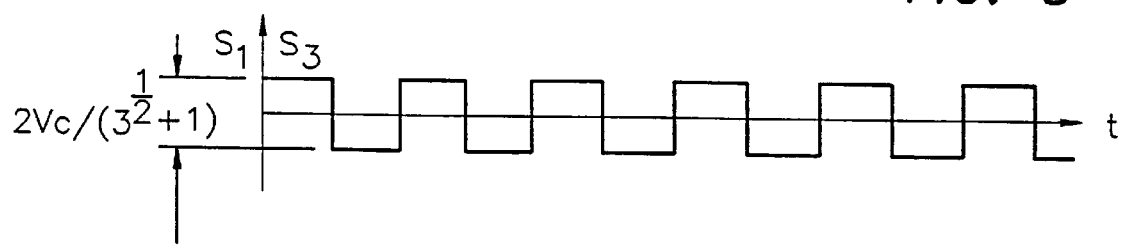
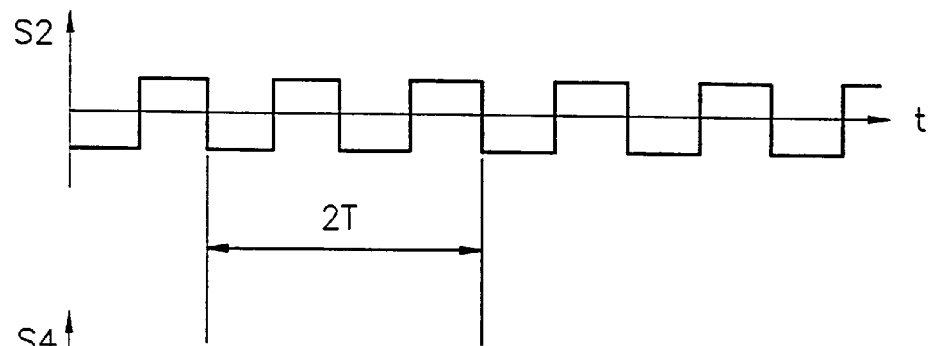
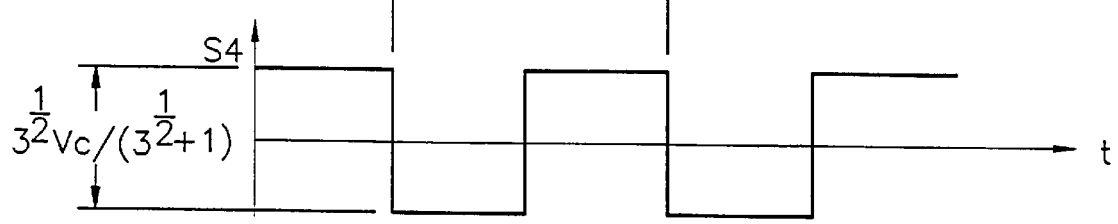
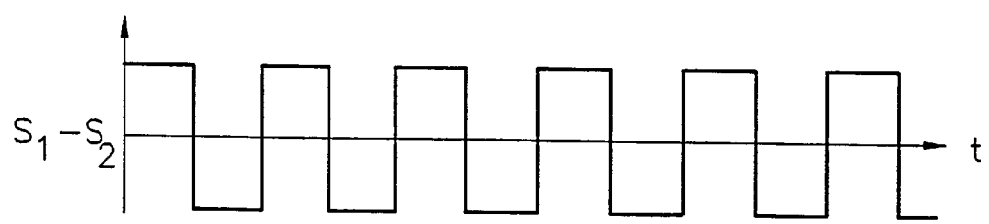
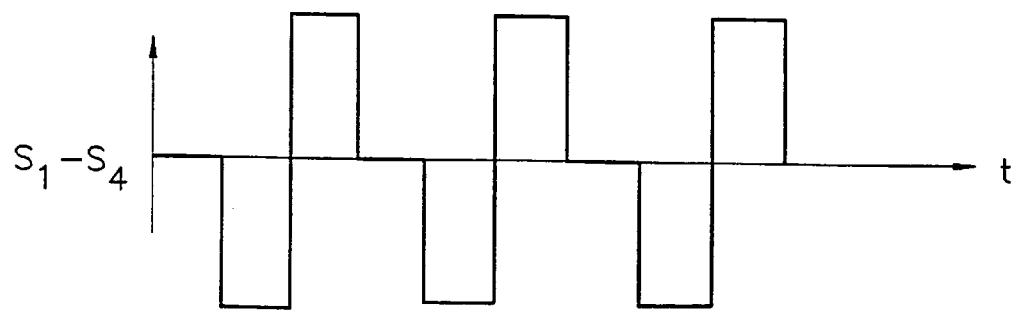

|  I  | II |
|-----|----|
| III | IV |
FIG. 11A
| ON  | ON  |     | OFF | ON |     | OFF | OFF |     | ON | OFF |
|-----|-----|-----|-----|----|-----|-----|-----|-----|----|-----|
| OFF | OFF |     | OFF | ON |     | ON  | ON  |     | ON | OFF |
FIG. 11B
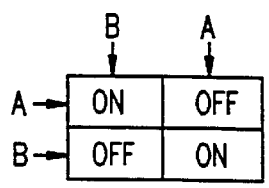 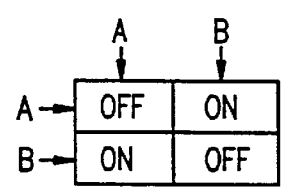
FIG. 11C
| OFF | ON |     | ON | OFF |     | ON | ON  |     | ON  | ON |
|-----|----|-----|----|-----|-----|----|-----|-----|-----|----|
| ON  | ON |     | ON | ON  |     | ON | OFF |     | OFF | ON |
FIG. 11D
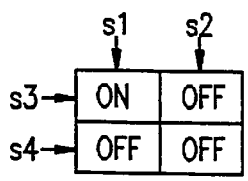 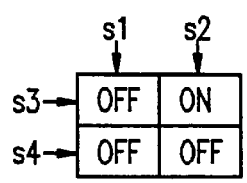 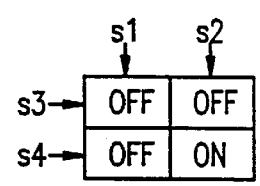 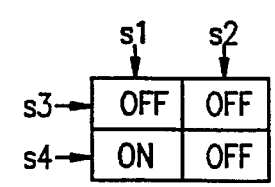
FIG. 11E

|  | s6 | s5 | s4 |
|---|---|---|---|
| s1– | I<br>"0" | II<br>"0" | III<br>"1" |
| s2– | IV<br>"0" | V<br>"1" | VI<br>"1" |
| s3– | VII<br>"1" | VIII<br>"1" | IX<br>"1" |

FIG. 15

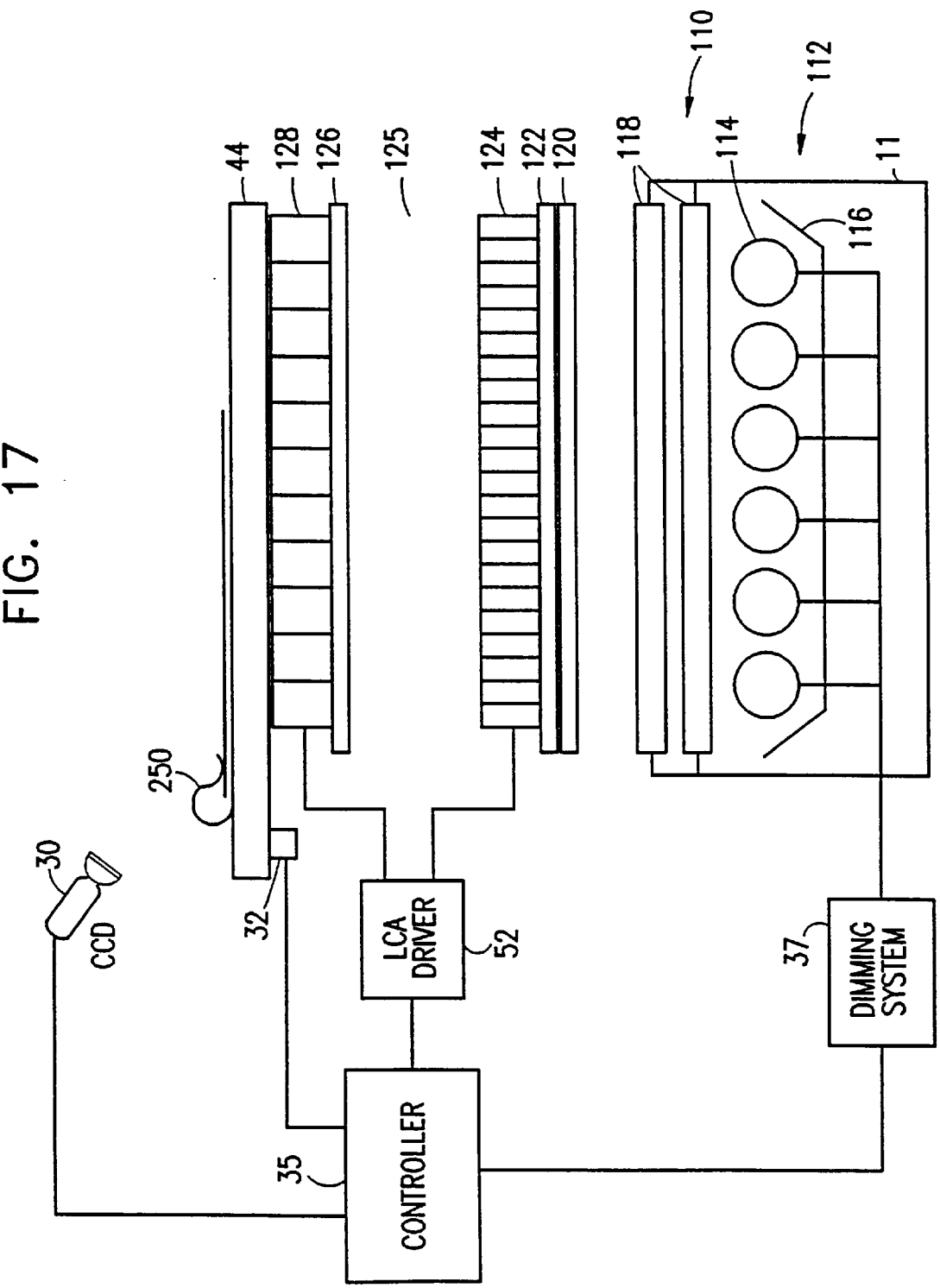

DISPLAY DEVICE

DESCRIPTION

1. Field of the Invention

This invention is generally related to the field of transparency viewing apparatus, and more specifically to the field of transparency viewing apparatus using a liquid crystal array display surface.

2. Background of the Invention

The use of liquid crystal arrays (LCA) as the display surface for a transparency has been mooted in the past. Such systems, in order to be optimally effective, require that the portion of the array which underlies the transparency (or the portion thereof) being viewed has sufficient brightness to enable viewing of the image and that the contrast ratio between the bright and dark portions of the array (namely the area outside the transparency or an image region of the transparency) be high.

The use of active matrix, passive matrix and direct drive technologies for LCAs have been described in the art. Each of these technologies, as they are used in the art, have substantial drawbacks when applied to a transparency viewer. Active matrix arrays have the drawback of high cost for the array because of the additional process steps required for the active elements and the difficulty in achieving large size arrays due to the limitations of semiconductor thin film technology.

Direct addressing systems have large spacings between the elements for the passage of the large number of conductors needed for this system thus interrupting the continuity of the active regions of the LCA and reducing the contrast of the system. The large number of drivers required increases the cost of the associated electronics especially for large arrays.

Passive matrix systems suffer from much lower contrast and viewing angle than active matrix systems due to the scanning limitations of the multiplex drive systems which are generally required for such systems. This is especially true when a number of different areas are bright and dark in systems which have the flexibility to provide a large number of such areas. On the other hand, both the passive matrix arrays themselves and their associated electronics are more available and less expensive compared to direct addressing systems. However, while such passive matrix systems do have smaller inactive stripes between the LCA elements than the direct addressing matrix LCAs, in some cases even these stripes can be troublesome to the viewer.

Another problem with LCA viewers is caused by the fact that the contrast of LCAs is a strong function of the angle of incidence of the light which illuminates the LCA, with maximum contrast being available for near normal incidence. Since back illumination is by its nature relatively isotropic, the contrast of the viewing surface is further degraded.

SUMMARY OF THE INVENTION

The present invention seeks, in one aspect thereof, to overcome some of the limitations of the prior art by utilizing a passive LCA and by driving the array in a novel manner which takes account of the nature and shape of the types of transparencies which are to be viewed on a transparency viewer.

The invention is especially suitable for the viewing of medical images, such as X-Ray films or transparencies which are produced by hardcopy devices associated with digital medical imaging equipment such as computerized tomographs, gamma cameras, medical ultrasound imagers, digital subtraction angiography equipment or digital radiography equipment.

In particular, this aspect of the invention is based on the realization that, in general, at a given time, only a limited number of film sizes are viewed allowing both an extreme simplification of the system electronics and a large increase in the available contrast ratio (between bright and dark masked areas of the viewer surface) of the system.

Unlike most LCA systems, which require great flexibility for the placement and size of bright and dark areas, medical imaging systems require only a relatively limited number of relatively large bright regions on a dark background. Furthermore, the bright regions, even when they are not contiguous, are normally of the same height and require that the same rows of the array be off (i.e., bright for normally clear LCAs) for all the columns which are partly covered by the transparencies. The present inventors have determined that this configuration corresponds to a reduced set of a two by two grouping of rows and columns (two groups of identical rows and two groups of identical columns).

Using conventional LCD drive electronics, this fact would not provide a substantial improvement in operation. In fact, a paper by Nehring and Kmetz entitled "Ultimate Limits for Matrix Addressing of RMS-Responding Liquid-Crystal Displays" (*IEEE Transactions on Electron Devices*, Vol. ED-26, No. 5, May 1979) proves that the maximum ratio of the voltages across the on and off elements that is achievable for the general two by two matrix is 3:1. This results in contrast and viewing angle which is less than optimal for viewing medical transparencies. However, the present inventors have found that, for the case described above, row and column groupings in accordance with the invention result in as few as three driver signals being required for the system. Furthermore, an optimal drive voltage which results in maximum contrast and viewing angle, without LC drive signal overvoltage anywhere in the system, can be applied by selection of an appropriate time (or phase) shift between the driver signals by appropriate selection of the signal voltages and/or frequencies, or by appropriate combinations of these variables. Application of these optimal signals to the groups of rows and columns results in an infinite voltage ratio and the maximum contrast which is theoretically achievable by the elements of the array.

Many aspects of the present invention are based on the grouping of rows (and columns) which have the same arrangement of bright and dark pixels and driving these groups with the same driving voltage. In the present case, where transparencies are viewed, this grouping allows for substantial reduction in the number of drivers and improvement in the contrast over what would be achieved if the rows (or columns) would be separately driven. This general idea of grouping of the rows and columns having the same arrangement of bright and dark pixels and driving them together, can be applied to a wide variety of groupings in which the number or groups is less than the number of rows (or columns), for example, the particular cases which follow. In each case, by reducing the number of drive voltages, the driving scheme is equivalent (from the point of view of possible contrast which is achievable) to a smaller matrix or even to direct addressing. This results in a higher contrast viewing surface than if the LCA were driven in the normal fashion.

In a preferred embodiment of the invention rows and columns of the LCA are each formed into two groups, a first group of rows (or columns) which contains all those rows (or columns) which have identically configured on and off elements and a second group comprising all rows (or columns) for which all of the elements are on or activated (i.e., non-transmitting for a normally bright display). The rows and columns in a given group are not necessarily contiguous. In this embodiment all of the rows or columns are included in one of the two groups and each of the rows or columns in a group has an identical configuration of on and off elements.

In a preferred embodiment of the invention, the first group of columns is driven by a signal $S_1$ and the second group is driven by a signal $S_2$. The first group of rows is driven by a signal $S_3$ which is the same as $S_1$, and the second group of rows is driven by a signal $S_4$. Preferably, each of the signals is a square wave having a relatively arbitrary period T and voltage levels of zero volts and $V_c$, which is less than the maximum allowable array voltage. $S_2$ is preferably delayed with respect to $S_1$ by a time 2T/3 and $S_4$ is preferably delayed by T/3 with respect to $S_1$, This arrangement results in the "bright" areas being subjected to zero voltage and the dark areas being subjected to an alternating stepped voltage having a peak value equal to the peak value of the driver signals and an RMS value of $(2/3)^{1/2}V_c$.

In a second preferred embodiment of the invention, three of the voltages are square waves having a period T and a peak value of $2 V_c/(3^{1/2}+1)$, with $S_1$ and $S_3$ being the same and $S_2$ being delayed by T/2 with respect to the other voltages. $S_4$ can have one of three forms, in each case being a square wave having a voltage equal to $3^{1/2}V_c/(3^{1/2}+1)$. In one case the period of the square wave is T*2M (where M is an integer). In a second case it is equal to T/2M (where M is an integer). In both these cases, a rising edge of this signal coincides with either a falling or a rising edge of the signal $S_1$. In a third case the period is T, but $S_4$ is delayed by T/4 compared with $S_1$. In this second embodiment the RMS voltage on the individual elements is $2V_c/(3^{1/2}+1)$.

The same driving systems can be used for other configurations of dark and light areas which also represent commonly encountered configurations. One example of such a configuration is a multi-imager array of n×m images on a single transparency as is normally produced to show the results of a gamma camera study or an ultrasound study. In such studies, a film is often provided with images arranged in an array, the images being separated by unexposed (clear) film. Several of such films can be placed side by side, which would result in a larger array of films. The only requirement for the optimal application of this aspect of the invention is that it be possible to group the rows (and columns) into two groups where all the elements of one group do not include an image and a second group where all the elements of the second group have identical configurations of image and non-image portions.

In certain cases this two by two grouping can be further reduced to a one by two grouping.

Infinite voltage ratios are also achieved for various one by two groupings, in accordance with the invention. For the one by two situations only one or two voltage waveforms are required and infinite voltage ratios across the bright and dark areas of the LCA are also achieved.

As described above, it has been found that when a normally bright LCA is used to illuminate a transparency, the voltage ratio on the elements can be made infinite, giving very high contrast between the bright and dark areas of the LCA. This follows from the fact that this situation requires that all areas except a rectangular area (or an area which is functionally equivalent to a rectangular area) be addressed with a voltage which turns off the LCA. However, when a normally black LCA is used to illuminate the transparency, the results are less ideal. In this case, in order to illuminate the transparency, the area of the LCA underlying the transparency must be addressed with a relatively high voltage which activates the area and the other areas are addressed with a relatively low voltage which does not activate the area. While for this situation the voltage ratio is no longer infinite, in a preferred embodiment of the present invention, a voltage ratio of 3 to 1 is achievable (equal to the "theoretical" maximum postulated in the above referenced paper) while using binary logic. In the past such high ratios were achieved only using analog drivers. Where binary drivers were used, this theoretical ratio was not achieved. It should be understood that in the prior art large matrices were not driven in accordance with the grouping of the present invention, leading to much lower contrast.

Furthermore, the present inventors have found that for the case where two different size transparencies are to be illuminated by the same LCA (a special case of the 3×3 grouping) a voltage ratio of 2.8 can be achieved using binary logic for most of the LCA which is far higher than the 2 ratio achievable according to the theoretical analysis referenced above. A portion of the LCA will have a ratio of less than 2. Again, a major gain in contrast is achieved by grouping similar rows and columns and driving them together.

The achievement of such higher contrast ratios improves the "blackness" of the area surrounding the transparency (or an image portion thereof) to a great extent, thereby improving the visualization of the transparency by the physician or other reader of the transparency.

In a second aspect of the invention, two layers of LCD are used to improve the contrast between the bright and dark areas. The use of two layers of LCD to improve contrast has been reported previously. However, in a preferred embodiment of the invention, advantage is taken of the fact that the contrast reduction of LCA elements is not generally symmetrical about normal incidence and that generally contrast falls off in first angular direction faster than in a second symmetrically opposed angular direction. In a preferred embodiment of the invention, the two arrays are configured with the respective first angular direction of one array aligned with the second angular direction of the second array. This configuration is conveniently accomplished by turning over one of the arrays with respect to the other. This configuration results in higher contrast over a wider viewing angle for the two layer system than would have occurred had the arrays been aligned in the same direction, which has been previously reported.

In a preferred embodiment of the invention, use of a left handed liquid crystal for one of the LCAs and a right handed LCA for the second LCA improves the viewing angle due to compensation of optical directionality of the LCAs.

Additionally, in a preferred embodiment of the invention, the two LCAs are offset horizontally and/or vertically by a fraction of an array element, for example, by half an element of the array. Using an offset configuration reduces the stripe effect noted above to a series of small bright points in the dark areas, which results in an improved contrast between bright and dark areas. This is much less objectionable than a grid of lines. The objectionable effect can be further reduced by using a diffuser.

Further, in a preferred embodiment of the invention, only three polarizers are used in the double layer LCA, with (for example, for a normally clear twisted nematic LCA) one polarizer on each of the outer faces of the double LCA having a first direction of polarization, and a single polarizer between the two layers, having a polarization of 90° with respect to the other polarizers. This is in contrast to the prior art situation in which two polarizers are associated with each LC array. Removal of one polarizer improves the chromatic characteristics of the array and reduces the light attenuation of the array. In general, if n LCA layers are used, n+1 polarizers are required.

In a further aspect of the invention, a camera, preferably a CCD camera, is used to image the front of the transparency viewer and to determine the shape of the portion of a film on the viewer which is not transparent. In this aspect of the invention, the horizontal and vertical extents of this portion of the film are determined and used to control which rows and columns should belong to the first and second groups.

One problem with such a system is that the entire viewing surface must be lit during the time that the image is acquired by the camera. This causes glare to the user, especially if the system is used in a dark reading room. Furthermore, the camera must be placed so that it views the transparencies practically perpendicularly.

In a preferred embodiment of the invention, a Brightness Enhancement Film (BEF) such as is available from Minnesota Mining and Manufacturing Company is placed between the backlighting and the LCA. This film has the property that it accepts light from many directions on one side of the film and transmits the light through to the other side of the film mostly in a relatively small conical angle of about 35° about the normal. In addition, a sidelobe of light is transmitted at about 70° to the normal. In a preferred embodiment of the invention, the camera is placed at the sidelobe angle. It should be understood that, when the array is in the off state, the off state is most effective at the normal and is much less effective at the sidelobe angle. Thus, when the LCAs are in the off state, the operator, who views the surface from a generally normal direction, sees a black surface. However, the camera receives some light since the off state is much less effective at the sidelobe angle and a CCD camera can acquire an image of the front of the viewer. This configuration allows for the determination of the extent of the image on the film while the LCA is turned off. Contrast is also improved when using the BEF.

In a further preferred embodiment of the invention, a normally dark LCA is used together with a normally bright LCA to achieve better contrast between bright and dark areas of the viewing surface and also to achieve high contrast ratios over a wider angular range than with the apparatus described above.

Where only one type of LCA is used for illuminating a transparency, using a normally dark LCA is less desirable than using a normally bright LCA. One reason for the preference for normally bright LCAs is that the addressing schemes available result in higher contrast ratio for the normally bright LCAs than for the normally dark LCAs, as was described above. A further reason for this preference is that in a normally dark LCA, the margins of the pixels are not active and are always dark. Use of normally dark LCAs alone would result in an annoying grid of lines in the bright areas of the LCA. On the other hand, the dark areas of a normally dark LCA, if properly illuminated, can be darker off-axis than the normally bright LCAs allowing for comfortable viewing of the transparencies over a larger viewing angle, e.g., by more than one person.

Thus, in a preferred embodiment of the invention a normally dark LCA is provided between the normally bright LCA (or multi-layer LCA) described above and the backlighting.

Preferably, light from a backlighting source (which is preferably thermally isolated from the LCAs) is diffused and passed trough a BEF. The light exiting the BEF illuminates a preferably relatively high resolution normally dark LCA. The light which exits the normally dark LCA is preferably diffused somewhat to reduce the effect of the dark lines between the bright pixels of the LCA and is used to illuminate a normally bright LCA. This normally bright LCA may be any of the LCA systems described herein and may comprise one or more stacked LCAs. The normally bright LCA may be a lower resolution LCA than the normally dark LCA.

For the configuration described above, each of the elements provides a contribution to an overall high contrast of the system over a wide range of viewing angles. The normally dark LCA provides a high resolution masking of the area surrounding the transparency. The diffuser has at least two functions. One of these is to diffuse the light from the bright pixels into the dark margins of the pixels in the normally dark LCA. A second function is to convert the narrow angle illumination leaving the normally dark LCA to substantially isotropic illumination, so that the final viewing angle of the illuminator will be high. The normally bright LCA enhances the contrast between the bright and dark areas of illumination which is required for optimal viewing of the transparencies.

The normally bright LCA may be of lower resolution than the overall resolution required by the system since the normally dark LCA provides the required resolution. In general a normally bright/normally dark illumination system as described above provides a "softer" transition from black to bright than does an illuminator with only a bright LCA, since the diffuser reduces the sharpness of the transition. Such a softer transition is useful for viewing the entire area of a transparency including the edge areas of the transparency as is required, for example, for viewing mammograms.

The diffuser used in the normally bright/normally dark illumination system is preferably spaced by several millimeters from the output face of the normally dark LCA. It has been found that such spacing allows for a lesser amount of diffusion by the diffuser while achieving an overall diffusion effect sufficient to achieve the desired effects described above and also preserves a measure of the directionality of the light. Since a lesser amount of diffusion results in less depolarization of the light, the use of a spacing and a low level of diffusion results in lower light loss in a polarizer preceding the normally bright LCA and higher overall efficiency of the device.

Preferably, an anti-glare face plate (a matte surface) is provided over the normally bright LCA to reduce glare (which in turn reduces contrast) from room lighting.

In a further aspect of the invention, compensation is provided for the chromaticity of the LCA layers. In particular, the LCA layers selectively attenuate blue light compared to other parts of the spectra. While this absorption is generally not serious for other uses of LCAs, viewers for medical films generally require light having an equivalent temperature of preferably above 5000° K and more preferably about 6500° K. In one preferred embodiment of the invention, light sources having a complementary spectrum to the absorption of the LCAs is used. In a second preferred embodiment, absorbers such as color filters are used or the surfaces of the backlighting structure are painted blue or some other compensating (selectively absorbing) color. In a third preferred embodiment of the invention, one or more complementary light sources are used together with white lamps in the backlighting system. The light of all the lamps is mixed before illuminating the surface of the viewer.

One problem which arises in the use of LCAs for medical imaging is that LCA panels are generally available in sizes of 14" by 14" while medical imaging films may be as large as 14" by 17". Such large films are generally viewed in portrait position, i.e., with the long side vertical.

In a preferred embodiment of the invention, a 14" by 14" panel is jointed with a 14" by 3" panel, with the small panel being joined to the lower edge of the larger panel. Joining such panels would result in unacceptable artifacts for most uses; however, for viewing medical images, an acceptable seam can be achieved by selective increase in diffusion of the light at the seam.

The invention will be more clearly understood from the following description of preferred embodiments thereof in conjunction with the following drawings which:

BRIEF DESCRIPTION OF THE DRAWINGS

FIG. 3 shows the waveforms of voltages which are applied to groups of rows and columns and to the elements of an LCA in accordance with one preferred embodiment of the invention;

FIG. 5 shows the waveforms of voltages which are applied to groups of rows and columns and to the elements of an LCA in accordance with a third preferred embodiment of the invention;

FIGS. 11A–E show various configurations of light and dark areas whose contrast can be enhanced in accordance with a preferred embodiment of the invention;

FIG. 15 shows a 3×3 configuration of energized and unenergized areas whose contrast can be increased in accordance with a preferred embodiment of the invention;

FIG. 17 shows a simplified cross-sectional view of a preferred embodiment of a transparency viewing device in accordance with a preferred embodiment of the invention.

DESCRIPTION OF THE PREFERRED EMBODIMENTS OF THE INVENTION

Figure 1:
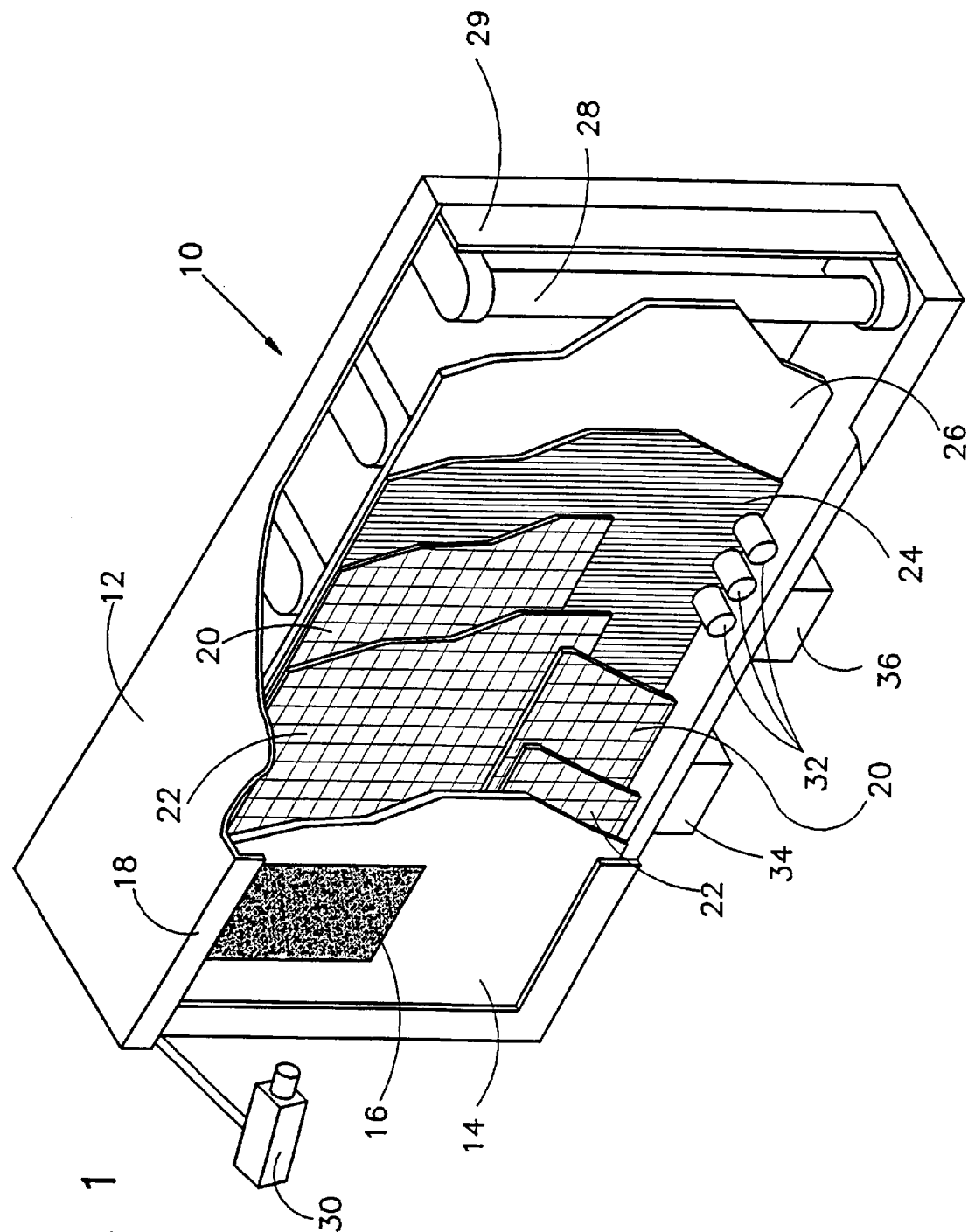
FIG. 1 is a partial cut-away perspective illustration of a viewing apparatus in accordance with a preferred embodiment of the invention.
Figure 2:
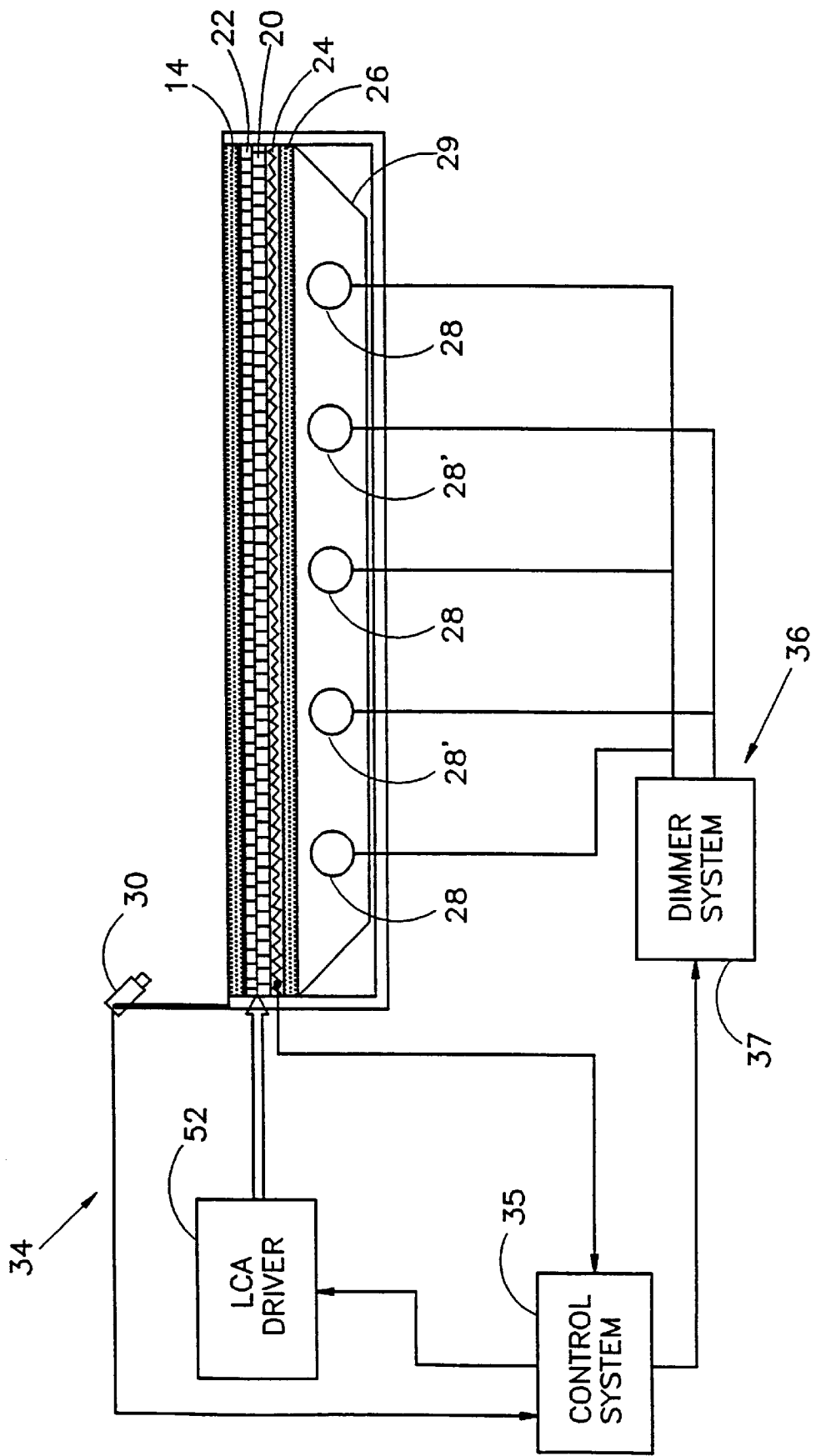
FIG. 2 is a cross-sectional illustration of the viewing apparatus of FIG. 1.

FIGS. 1 and 2 show a perspective partial cut-away illustration and a cross-sectional view of a transparency viewer 10 in accordance with a preferred embodiment of the invention. Viewer 10 comprises an opaque housing 12 which covers five sides of the viewer and a light transmitting face plate 14 covering the sixth side. One or more transparencies (films) 16 are held on faceplate 14 by slipping the transparencies under an edge 18 of housing 12. Alternatively, clips or other film holders may be provided to hold the film on the faceplate as is well known in the art. In some embodiments of the invention face plate 14 is a light diffuser.

At least one and preferably a sandwich of two Liquid Crystal Arrays (LCAs) 20 and 22 is located interior to faceplate 14. LCAs 20 and 22 are preferably passive matrix type arrays and the elements of the JCAs are arranged in rows and columns which are driven by drivers. When an element is driven by an RMS voltage above a given threshold, the element turns dark (for a normally bright or clear array) and when it is driven by a low or no voltage, the element is substantially transparent. The contrast between bright and dark areas will depend on the ratio of the voltages applied to the bright and dark elements.

A Brightness Enhancement Film (BEF) 24, such as manufactured by 3M Optical Systems, is optionally located behind the LCAs. An optional diffuser 26 is located between BEF 24 and a bank of illuminators 28, such that the light which reaches the BEF is substantially diffused. The interior of the housing, and at least back interior surface 29, is preferably painted so as to reflect and/or diffuse and/or mix the light incident upon it from illuminators 28.

Viewer 10 also preferably includes a camera 30, preferably a CCD camera, which views faceplate 14 (and any transparencies mounted thereon). Viewer 10 also preferably includes a plurality of color sensors 32 each of which is sensitive to a different portion of the spectrum and whose operation is described infra.

Control electronics 34 and electrical supply circuitry 36 for control and powering of viewer 10 are preferably mounted on housing 12.

In a preferred embodiment of the invention, compensation is supplied for compensating for selective chromatic absorption, such as of blue light, by LCAs 20 and 22. While this absorption is only about 10–30%, the light which passes through the LCAs is not considered acceptable for use in a medical image viewer. In one preferred embodiment of the invention, the mix of phosphors in illuminators 28 is chosen to compensate for the selective absorption of the LCAs. In a second preferred embodiment of the invention, the light is filtered by coloring the glass of the illuminators, by tinting one of the diffusers in the system or by adding a filter between the light and the front of the faceplate. In a preferred embodiment of the invention, one or more of the illuminators, designated by reference numeral 28' in FIG. 2, is a compensating blue light source. In a preferred embodiment of the invention, color sensors 32 (FIG. 1) view the light passing through film 24 and feed (spectral) brightness signals which they generate to a control system 35, which controls compensating blue illuminators 28' and daylight colored illuminators 28 via a lamp dimmer system 37, to achieve a desired color balance which compensates for the selective absorption of the LCAs.

Controller 35 can also be used to provide different lighting to different portions of the LCA. For example, if an area overlying a particular light bulb is dark, the bulb may be dimmed or extinguished, reducing the power requirements and improving the contrast (blackness) of that area. Additionally, if a chest film is being viewed, then less light may be supplied to the areas of the LCA underlying the lower (and much less dense) portion of the film than to the upper portion of the film. This would reduce the contrast within the film and allow for greater local contrast discrimination by the adapted eye of a viewer. Such reduction of light may be achieved for example by turning off some of the lights in the lower area of the transparency if the lights are sufficiently close to avoid undulating light at the surface of the LCA. Alternatively or additionally some of the lights may be dimmed to achieve the desired brightness variation.

In a preferred embodiment of the invention, a novel mode for driving the LCAs is used which allows for both simplified electronics and for substantially higher contrast ratios than was believed possible in the prior art. In particular, the present inventors have noted that the geometry normally present in transparency viewers can be simplified into a two by two matrix problem (or its equivalent for the LCD driver electronics). In the prior art as described above, it was believed that the maximum voltage ratio between areas of the array which were on and those which were off which could be achieved was 3:1. The present inventors have found that the problem of viewing transparencies of the geometries described above results in a particular subset of the general two by two matrix problem which allows for a higher voltage ratio and hence a higher contrast ratio between the bright and dark areas. This improved solution is possible for cases in which one of the four quadrants has essentially no voltage applied (i.e., is bright), and the other three have a voltage (i.e., are dark), which is the same for all of the quadrants, applied to them.

In a preferred embodiment of the invention, rows and columns of the LCA are each formed into two groups, a first group of rows (or columns) which contains all those rows (or columns) which have both on and off elements and a second group comprising all rows (or columns) for which all of the elements are on (i.e., non-transmitting). The rows or columns which make up the groups are not necessarily contiguous.

In a preferred embodiment of the invention, the first group of columns is driven by a signal $S_1$ and the second group is driven by a signal $S_2$. The first group of rows is driven by a signal $S_3$ which is the same as $S_1$, and the second group of rows is driven by a signal $S_4$. Preferably each of the signals is a square wave having a relatively arbitrary period T and voltage levels of zero volts and $V_c$, which is less than the maximum allowable array voltage. $S_2$ is preferably delayed with respect to $S_1$ by a time 2T/3 and $S_4$ is preferably delayed by T/3 with respect to S1. This arrangement results in the "bright" areas being subjected to zero voltage and the dark areas being subjected to an alternating stepped voltage having a peak value equal to the peak value of the driver signals and an RMS value of $(2/3)^{1/2} V_c$. The driver waveforms as well as the waveforms across the elements are shown in FIG. 3.

Figure 4:
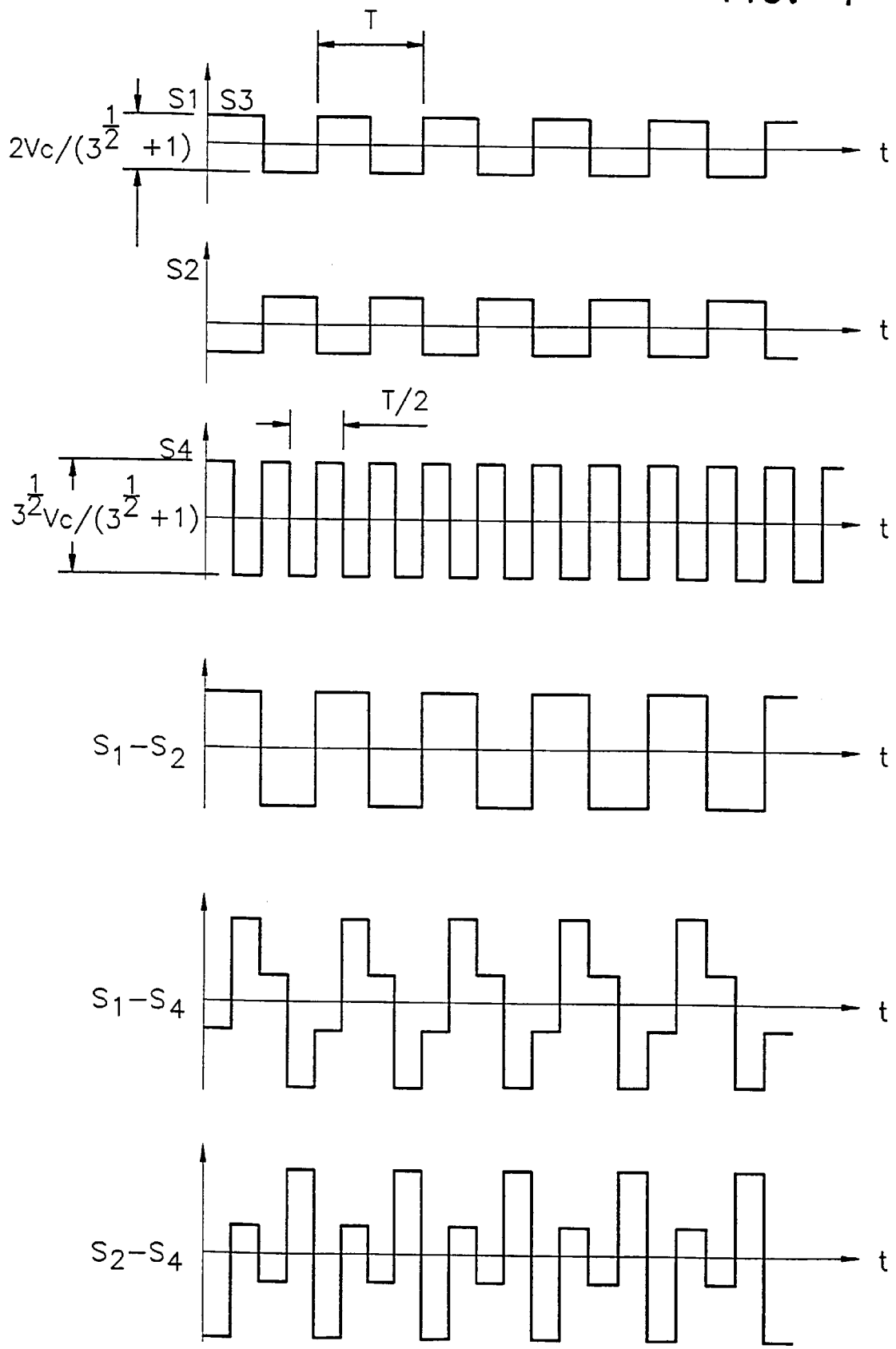
FIG. 4 shows the waveforms of voltages which are applied to groups of rows and columns and to the elements of an LCA in accordance with a second preferred embodiment of the invention.

In a second preferred embodiment of the invention three of the voltages are square waves having a period T and a peak value of $2V_c/(3^{1/2}+1)$, with $S_1$ and $S_3$ being the same and $S_2$ being delayed by T/2 with respect to the other voltages. $S_4$ can have one of three forms, in each case being a square wave having a voltage equal to $3^{1/2} V_c/(3^{1/2}+1)$. In one case the period of the square wave is T*2M (where M is an integer). In a second case it is equal to T/2M (where M is an integer). In both these cases a rising edge of this signal coincides with either a falling or a rising edge of the signal $S_1$. In a third case the period is T, but $S_4$ is delayed by T/4 compared with S1. In this second embodiment the RMS voltage on the individual elements is $2V_c/(3^{1/2}+1)$. The driver waveforms as well as the waveforms across the elements for two of these systems are shown in FIGS. 4 and 5.

Figure 6:
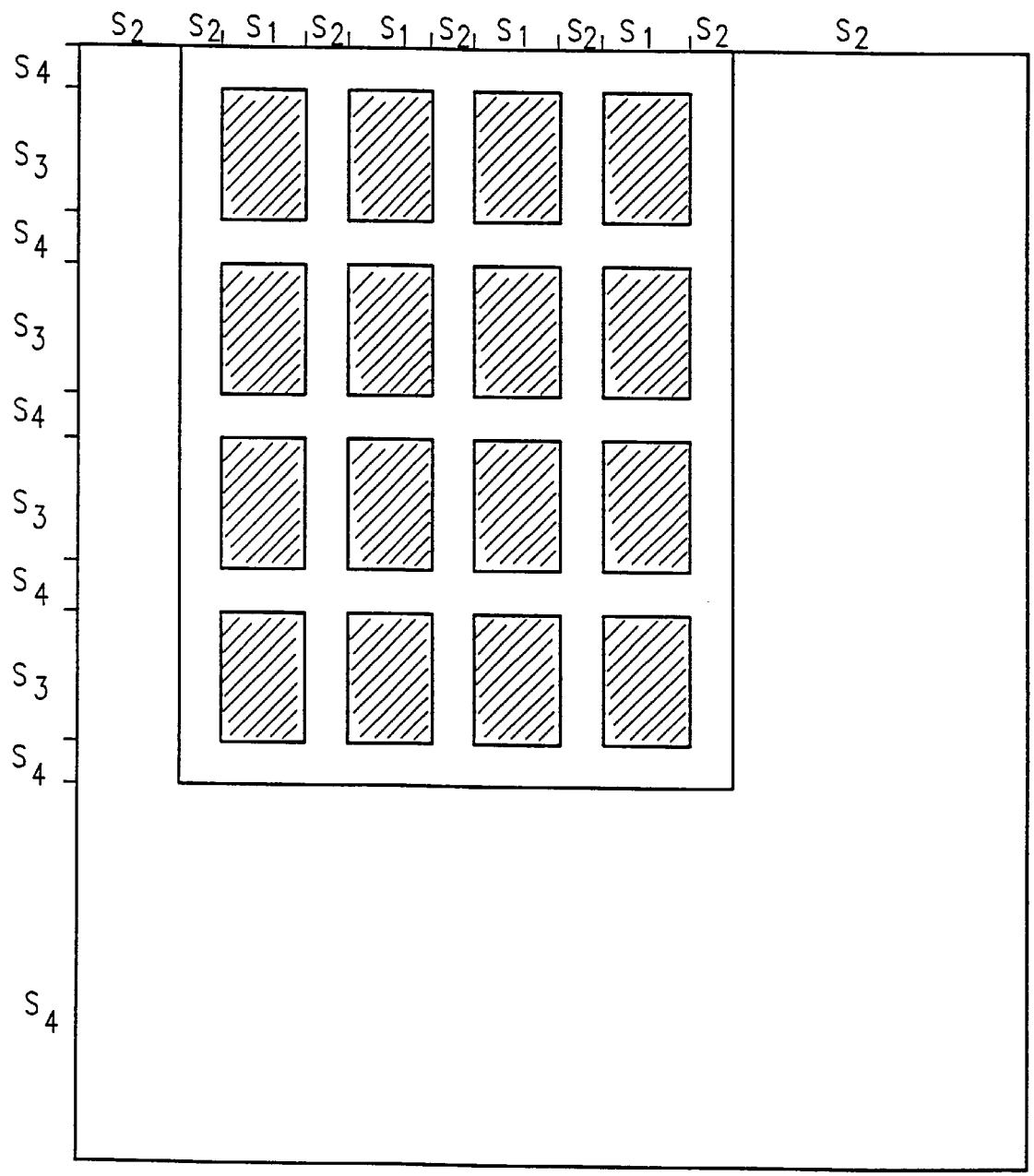
FIG. 6 illustrates a multi-imager film mounted on a viewer in accordance with the invention.

The same driving systems can be used for other configurations of dark and light areas which also represent commonly encountered configurations. One example of such a configuration is an array of nxm images on a single transparency as is normally produced to show the results of a gamma camera study or an ultrasound study. In such studies, a film is often provided with images arranged in an array, the images being separated by unexposed (clear) film. Such a configuration is shown in FIG. 6, in which image areas are shown by shading. Grouping of the rows and columns underlying the film is also shown in FIG. 6. Areas outside the film are all in the second group of rows and columns.

Several such films can be placed side by side, which would result in a larger array of films. The only requirement for the application of this aspect of the invention is that it be possible to group the rows (columns) into two groups where all the elements of one group do not include an image and a second group where all the elements of the group have identical configurations of image and non-image areas.

Figure 7:
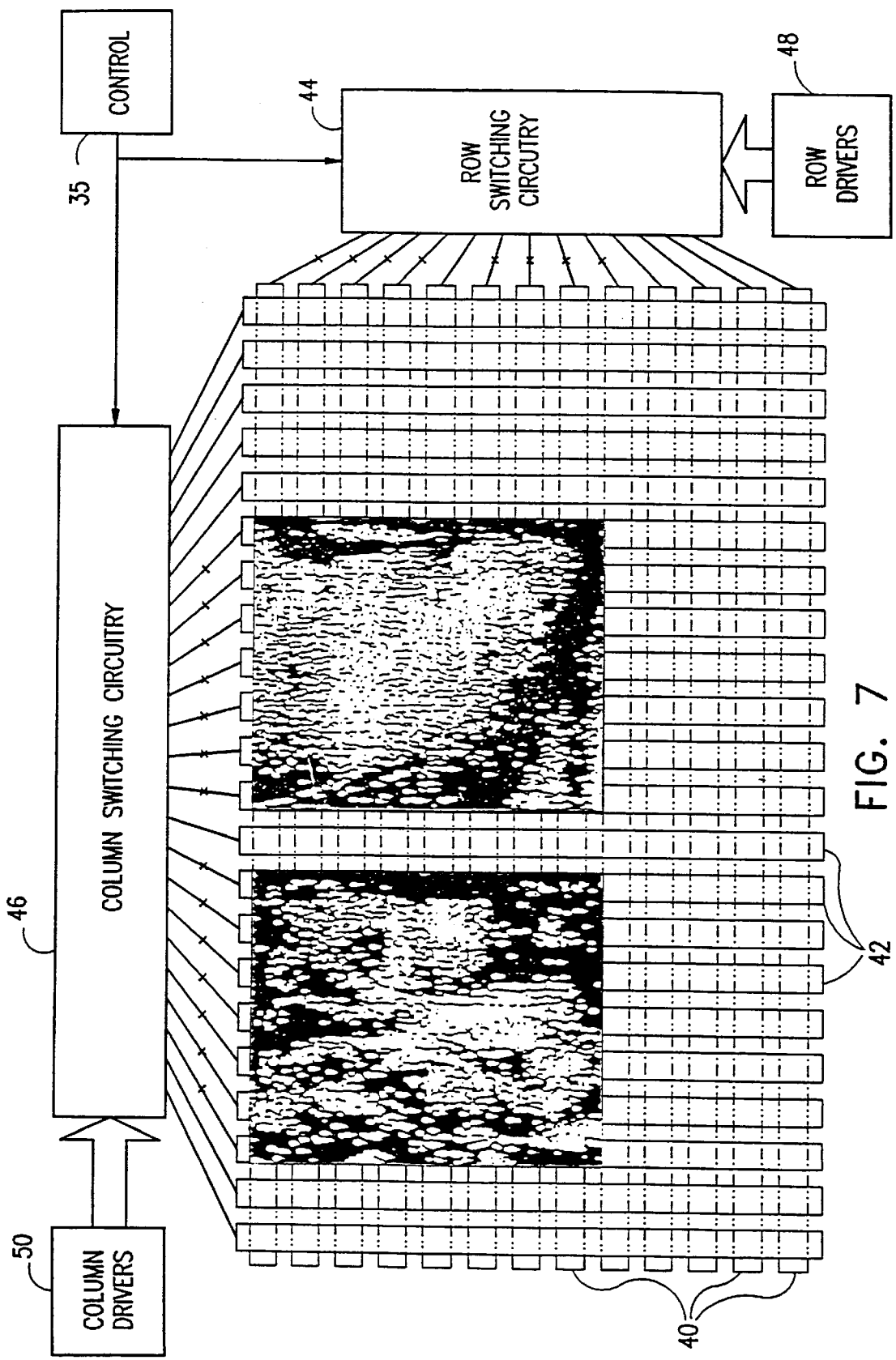
FIG. 7 is a schematic illustration of two films mounted in accordance with the invention together with a block diagram of the electronics used in carrying out the invention.

Apparatus for carrying out the driving of the LCAs is shown in FIGS. 2 and 7. FIG. 7 shows two films mounted on a faceplate. For simplicity all of the structure of the viewer is not shown except for a plurality of row and column electrodes 40 and 42. Also shown in FIG. 7 are row and column switching circuitry 44 and 46 which are controlled by a controller 35 (also shown on FIG. 2) and row and column drivers 48 and 50 which supply the drive signals $S_1$, $S_2$, $S_3$ and $S_4$ (see FIG. 6). Switching circuitry 44 and 46 and drivers 48 and 50 are referenced in FIG. 2 as LCA driver unit 52. Control 35 may receive information as to which regions of the LCA are to be illuminated either from camera 30 or from clips which hold the transparencies (such as clips 250 in FIG. 17) or from other position determining means known in the art.

In operation, switching circuitry 44 and 46 switches the rows and columns to respective ones of the drivers which supply the required voltages to the row or column. In FIG. 7, rows which belong to the first group of columns (and are driven by $S_1$) are indicated by an X as are those in the first group of rows (which are driven by $S_3$). The unmarked columns and rows are driven by $S_2$ and $S_4$, respectively.

The above analysis describes an optimal addressing scheme for one type of two by two pattern on the LCA (or a pattern which is equivalent to a two by two pattern). Other addressing schemes, using binary logic which give voltage ratios equal to, or for some portions of the display, better than, the "theoretical" limit proposed by the above referenced paper, are also possible.

FIG. 11A shows a two by two matrix of elements in which the rows and columns having similar characteristics have been grouped to form a two by two array of elements, each covering a region indicated by a Roman numeral I–IV. As described above these regions describe elements which are to be addressed together and not necessarily elements which are physically contiguous.

One simple type of configuration is the configuration in which all of the four regions of the two by two grouping are either activated by a voltage or not activated. In this simple case, which is actually a one by one addressing scheme, the maximum allowable activation voltage is applied to the rows (or columns) and ground is applied to the columns (or rows). Alternatively, other schemes may be used which give the same result. Of course if none of the regions are activated, no voltage need be applied to either the rows or columns.

A second type of configuration is shown in FIG. 11B. This FIG. shows a number of equivalent configurations in which either the rows or the columns can be divided into two groups, one group in which all the elements of the rows (or columns) are activated and a second group in which none of the elements are activated. In FIG. 11B and in FIGS. 11C–11E the activated (electrified) regions are marked "on" and the unelectrified regions are marked "off." In this case, The easiest way to achieve an infinite voltage ratio between the on and off regions is to apply the full activation voltage to the rows (or columns) which contain only activated elements and to ground the other rows and columns. Alternatively, a given voltage (or voltage waveform) can be applied to the rows (or columns) which contain only activated elements, and the inverse of that voltage can be applied to the other rows and columns. This configuration is actually a two by one addressing scheme.

A third type of configuration is shown in FIG. 11C. In this configuration, the (grouped) activated elements of the LCA form a two by two checkerboard pattern of activated and inactivated regions. Infinite voltage ratios can be achieved for this configuration most simply by applying different voltages "A" and "B" to the rows and columns as indicated on FIG. 11C. Voltage A and voltage B can be fairly arbitrarily chosen, with the limitation that the sum of A and B be equal to the voltage required to turn on the LC elements. It is clearly seen that the elements which are turned off receive the same voltage from their respective row and column electrodes and are thus subject to zero voltage. This results in an infinite voltage ratio.

A fourth type of configuration, for which optimal addressing schemes were given above, is shown in FIG. 11D. It should be noted that this configuration corresponds to one bright region for a normally bright LCA and to one dark region for a normally dark LCA.

A fifth type of configuration is shown in FIG. 11E. In this configuration all of the regions but one are not activated. This corresponds to one dark region for the normally bright LCA (which configuration is generally not of interest) and to one bright region for the generally dark LCA (which is of interest). It is believed that it is not possible to achieve infinite ratio between the voltages applied between to the on elements and the off elements for this configuration. However, the present inventors have found that it is possible to achieve a voltage ratio of 3:1 using binary logic.

Figure 12:
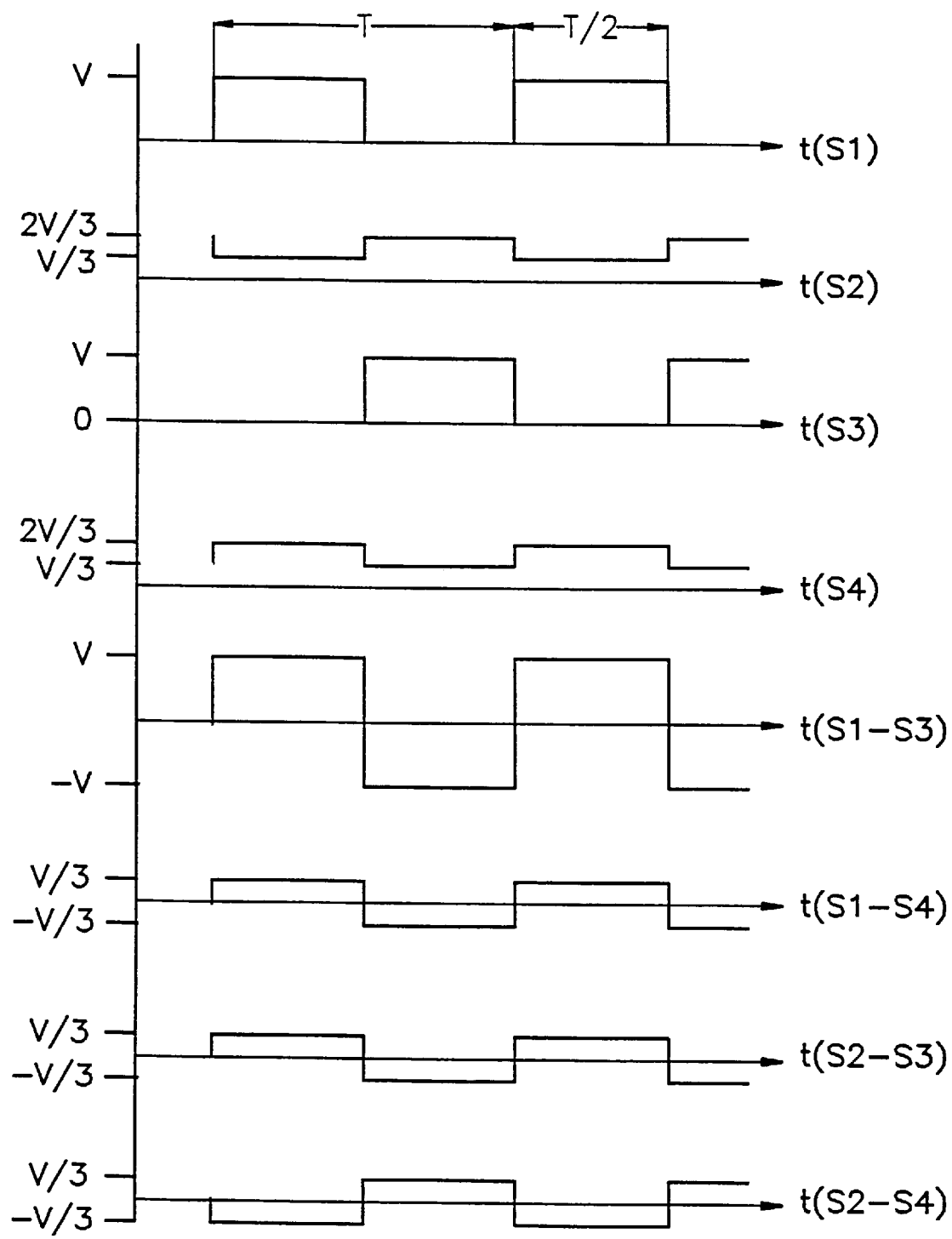
FIG. 12 shows a preferred embodiment of voltage waveforms for activating row and column electrodes to achieve the configuration of FIG. 11E.

FIG. 12 shows eight voltage waveforms. The upper four waveforms show the actual voltages supplied to the row and column electrodes of the LCA, and are coded with letters indicating the groups of electrodes to which they are applied. The lower four waveforms show the actual voltage waveforms on the LCA elements in each of groups I–IV. As can be seen from the lower four waveforms, the activated LCAs are subjected to a voltage having an RMS value of V, while the off LCAs are subjected to a voltage having an RMS value of V/3. This results in a ratio of 3:1 as indicated above.

Figure 13A:
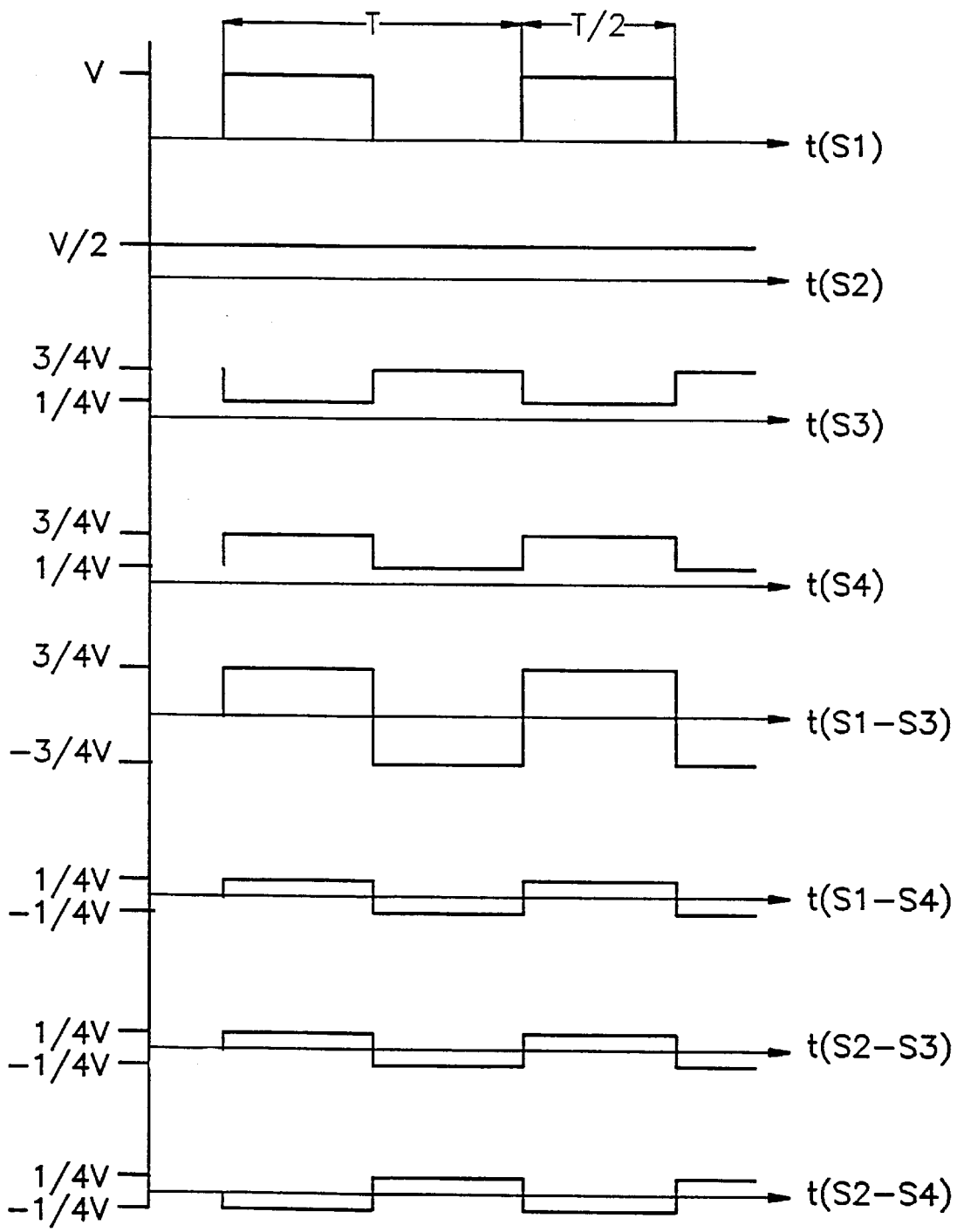
FIGS. 13A and 13B show alternate preferred embodiments of voltage waveforms for activating row and column electrodes to achieve the configuration of FIG. 11E.
Figure 13B:
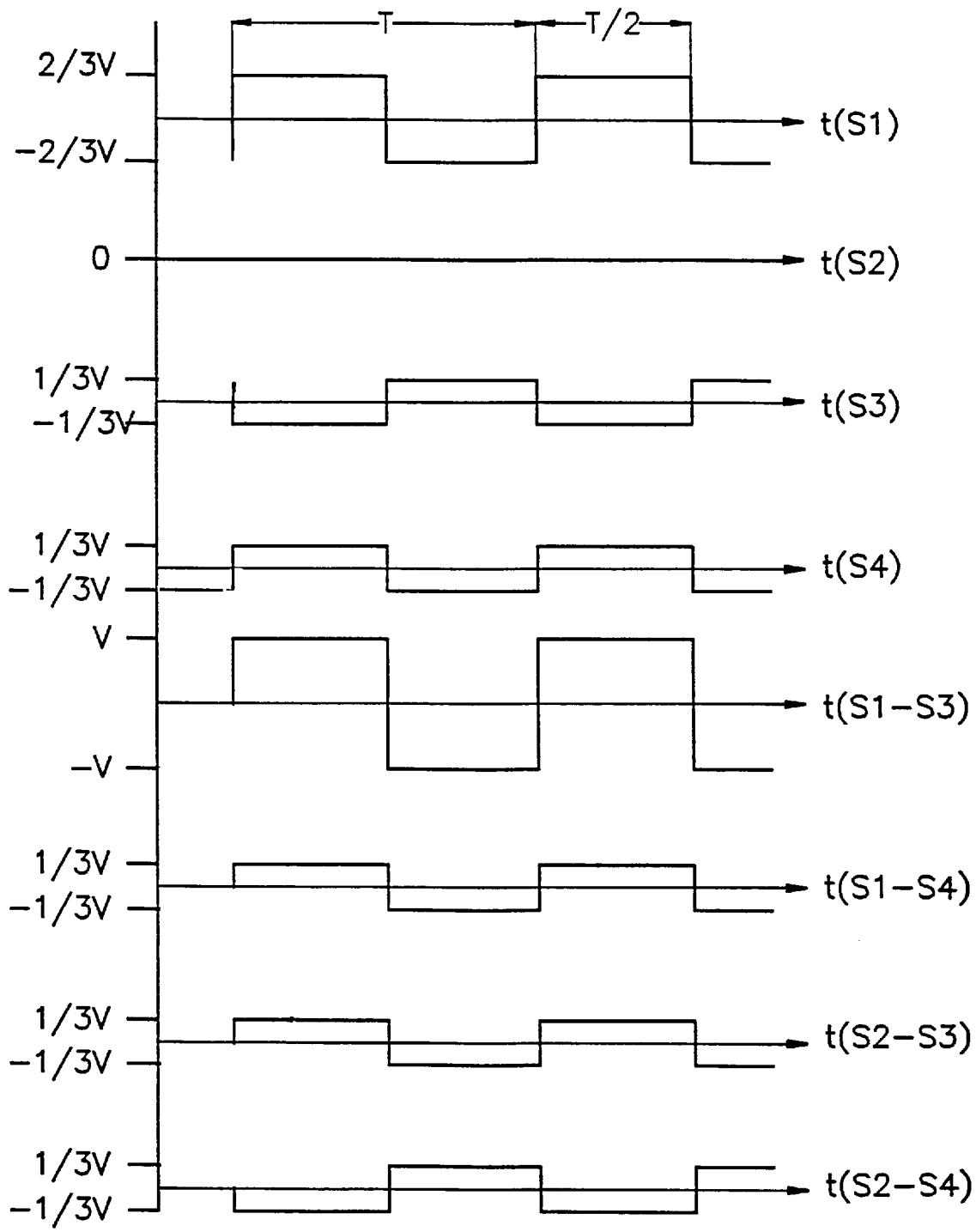

FIGS. 13A and 13B show alternative activation schemes for the configuration of FIG. 11E. In fact, numerous infinite number of configurations exist for achieving the improved contrast of the present invention.

Figure 14:
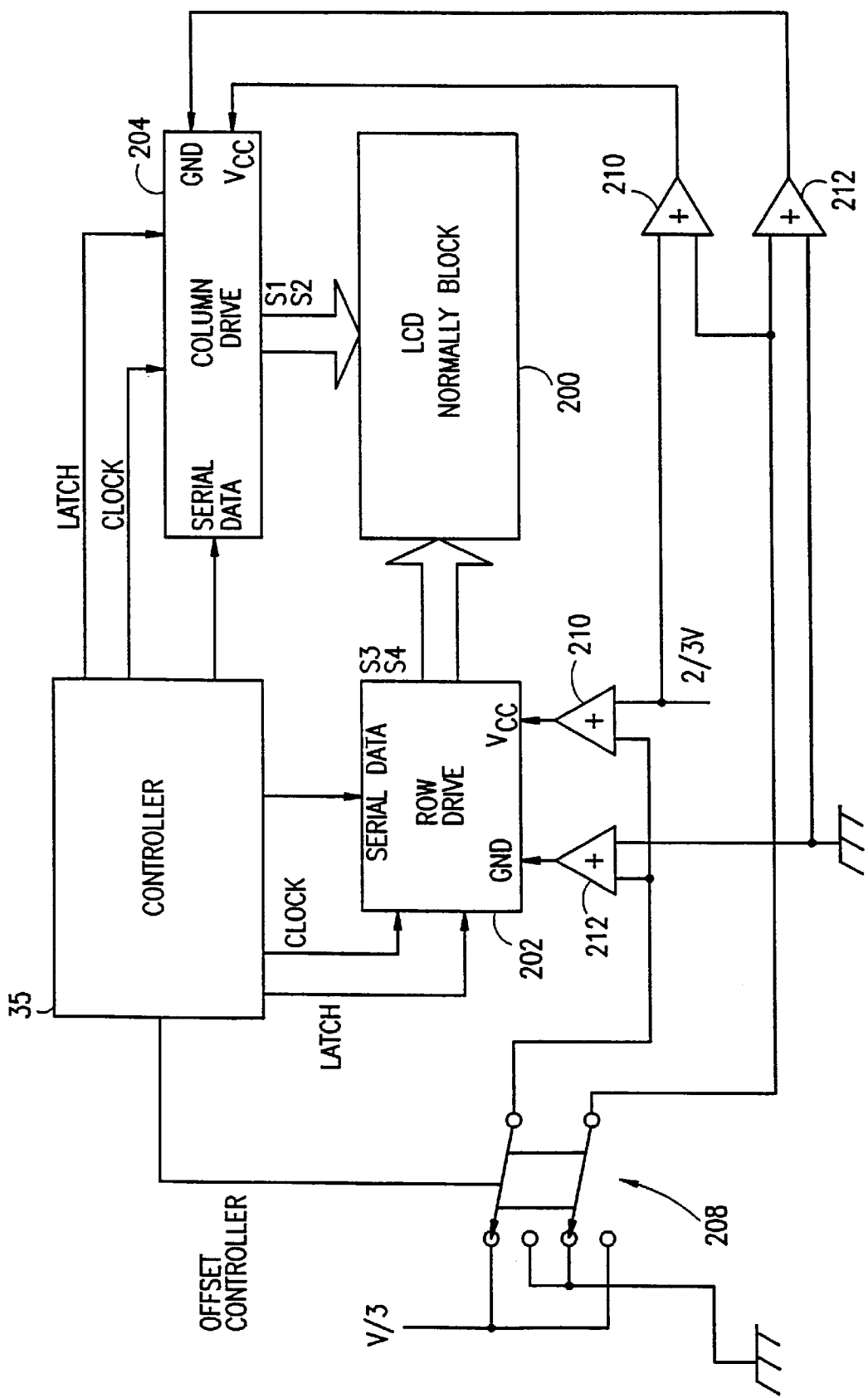
FIG. 14 shows a block diagram of apparatus suitable for a producing the voltage waveforms of FIG. 12.

FIG. 14 shows a preferred embodiment of a driver system (such as that shown in FIGS. 2 and 7) for achieving the voltage waveforms of FIG. 12. In this scheme standard binary logic hardware produces multi-level drive voltages by way of a synchronized variable power supply. A generally normally black LCA 200 is to be driven by a series of preferably MOS logic drivers (shift registers), for example 74HC595 manufactured by Motorola, grouped into row and column drivers 202 and 204 respectively corresponding to LCA driver 52 of FIG. 2. The switching of drivers 202 and 204 is controlled by controller 35, which produces pulses between ground and $V_{cc}$ based on indications of which elements are to be activated and determines which columns and rows are to be driven with which of the driving voltages $S_1$, $S_2$, $S_3$ and $S_4$. Controller 35 supplies the timing signals to the drivers and also supplies a signal to an offset switch 208 which switches an offset voltage of V/3 as described below.

A pair of power amplifiers 210 and 212 (for example PA26, manufactured by APEX) supply relatively high voltages (for example, $V_{cc}$) and relatively low voltages (for example zero) respectively to the MOS drivers in each of the row and column drivers. Adder 210 supplies a high voltage which is the sum of 2V/3 and (depending on the position of switch 208) the offset voltage V/3 or zero namely either V or 2V/3. Adder 212 supplies a low voltage which is either zero or the offset voltage, namely either V/3 or zero, again depending on the position of the switch. As shown in FIG. 14, when the switch is in the upper position, the rows electrodes can be at either V or V/3 and the column electrodes can be at either 2V/3 or zero. By switching the offset switch at T/2 intervals and driving the electrodes in accordance with the scheme determined by controller 206, the waveforms of FIG. 12 can be achieved.

Improved overall contrast can also be achieved for higher order matrices of on and off areas. For example, a configuration which is often encountered is one in which two different sizes of transparencies are viewed at the same time. The required activation scheme for such a situation, for a normally bright LCA is shown in FIG. 15, with the 3×3 regions indicated by Roman numerals I–IX and the inactive (bright) and activated (dark) areas marked with 0 and 1 respectively. The above referenced paper indicates that the maximum theoretical voltage ratio between the bright and dark areas is 2:1 for a uniform voltage for all of the bright and for all of the dark areas. The present inventors have found that when a nonuniform illumination is allowed for the dark areas, most of the dark areas can achieve a greater voltage ratio than this value.

Figure 16:
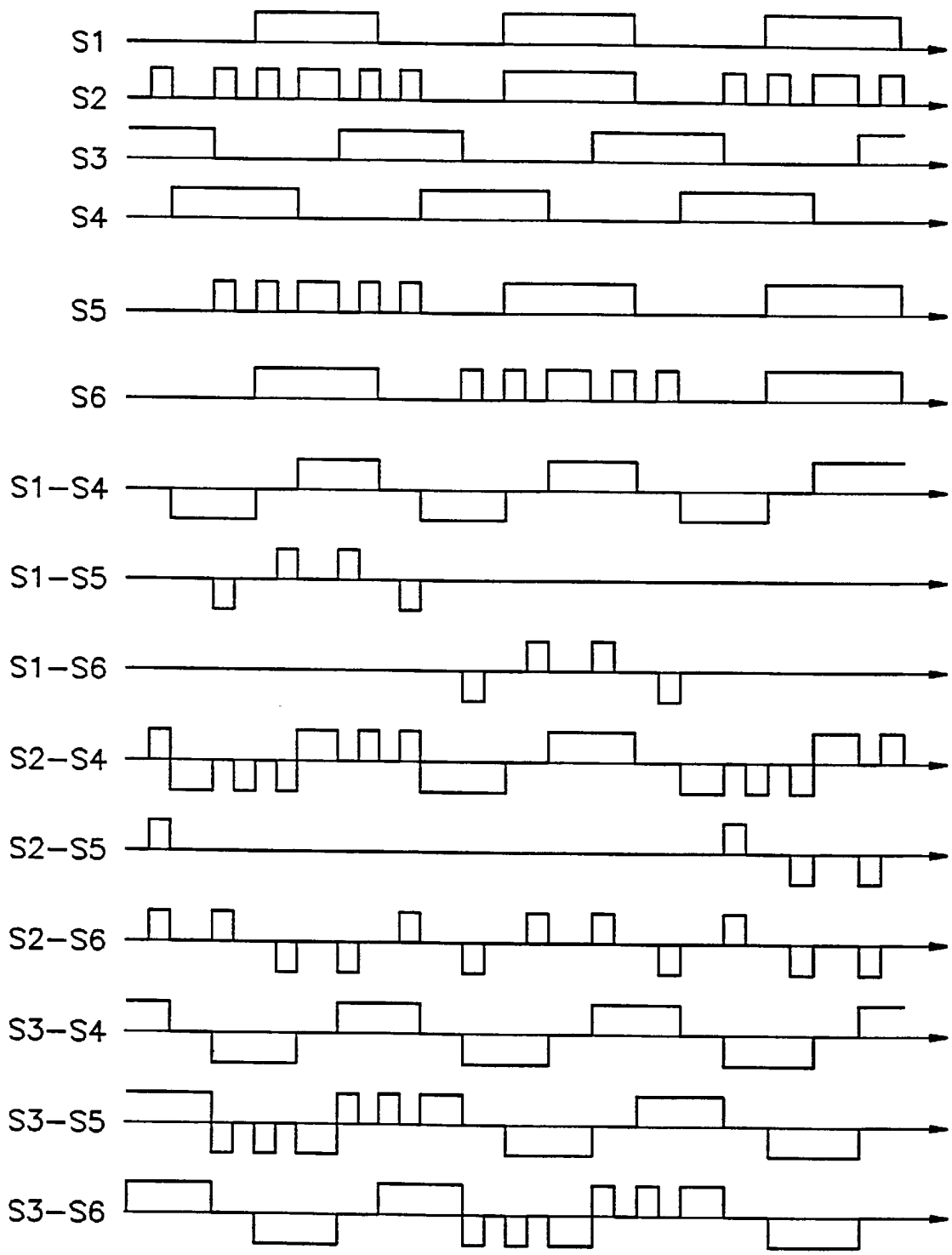
FIG. 16 shows voltage waveforms suitable for energizing row and column electrodes in accordance with the configuration of FIG. 15.

FIG. 16 shows a series of six driver voltage waveforms and nine element voltage waveforms to achieve a voltage ratio (with respect to the bright areas I, II and IV) of $8^{1/2}$:1 for regions III and VI through IX. Region V has a lesser ratio of $3^{1/2}$:1. Since the objective of the darkening of the non-transparency portions is better discrimination of details in the transparency portions, this improvement of contrast over a portion of the area is useful, even though the contrast is not improved over the entire area of the dark portion. This scheme uses binary logic.

Figure 8:
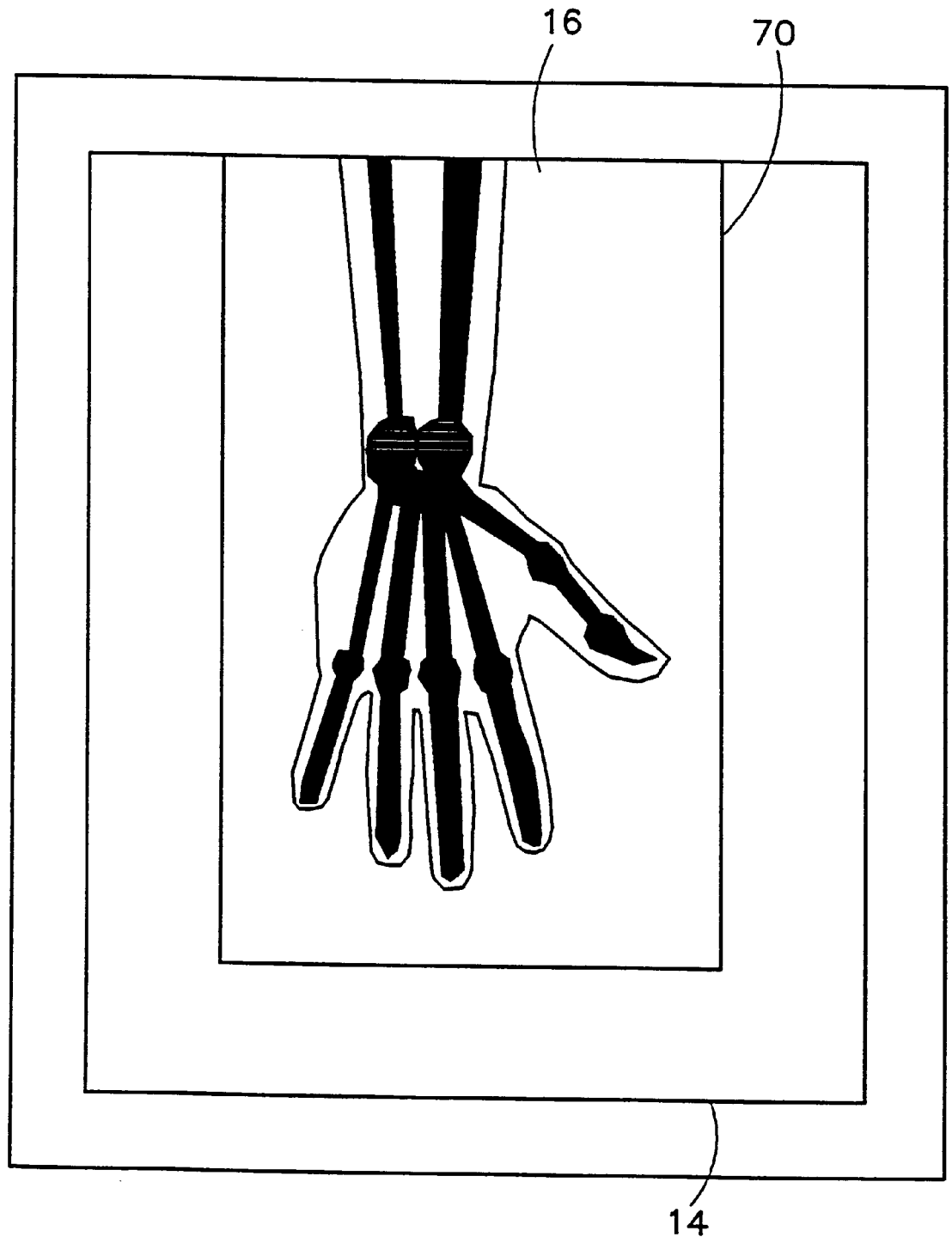
FIG. 8 illustrates a medical image film mounted on a viewer faceplate.

In general, films have overexposed borders as for example shown in a reversal X-Ray of a hand shown schematically in FIG. 8, in which the edge of the film is indicated by line 70. In order to reduce the amount of glare to which the viewer is subjected, the extent of the image area on the film which is illuminated should be minimized. This area, which has an extent equal to the extent of the image on the film, is determined in any one of a number of ways which are well known in the art; as, for example, those described in WO 91/10152 and WO 93/01564, the disclosures of which are incorporated herein by reference, and by edge detection algorithms.

Once the maximum horizontal and vertical extent of the image is determined, a rectangular region of interest is determined. Those columns and rows which include part of the image are grouped in groups $S_1$ or $S_3$ and the others are grouped in groups $S_2$ or $S_4$.

In a preferred embodiment of the invention, camera 30 is used to determine the extent of the image portion of film 16. As shown in FIG. 1, camera 30 is preferably positioned to receive light from the side lobe of BEF 24 when all the LCA elements are nominally turned off. As described above, almost no light passes the LCA in the normal (viewer) direction. However, due to the reduced contrast of the LCA at large angles and the high sensitivity of the camera, enough light from the sidelobe of BEF 24 passes through the LCA to enable the camera to form an image of the front face of viewer 10. Control 34, which receives the image, then analyzes the image either by determining the contour of the image using conventional image processing techniques or by scanning rows and columns of image pixels to determine the extent by a simple thresholding scheme as known in the art.

Figure 9:
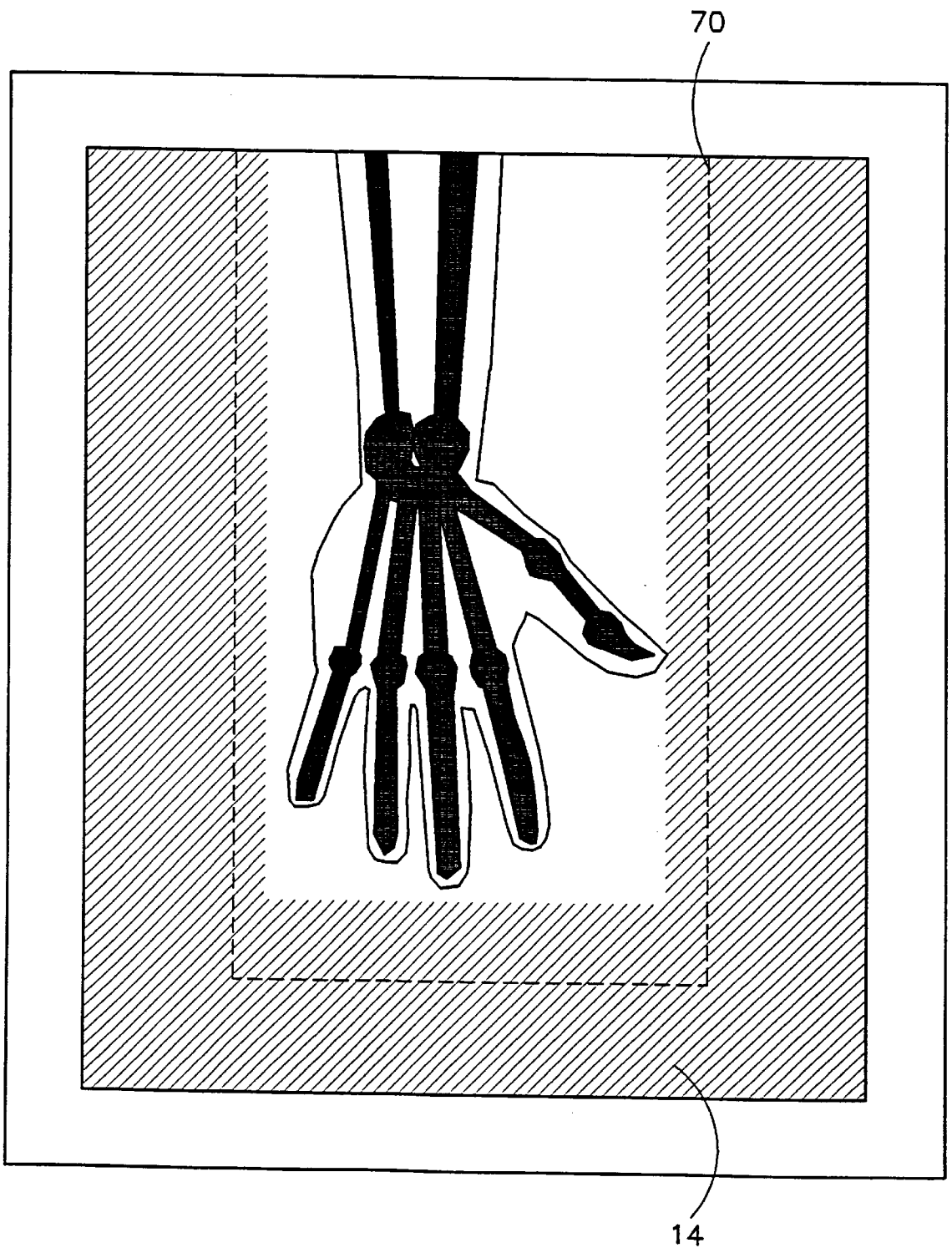
FIG. 9 illustrates masking of the image portion of the film of FIG. 8 in accordance with a preferred embodiment of the invention.

In any event, once the extent of the image is known, the grouping described above results in masking of the image portion as shown in FIG. 9, in which the dark portions of the LCA are indicated by shading.

Figure 10A:
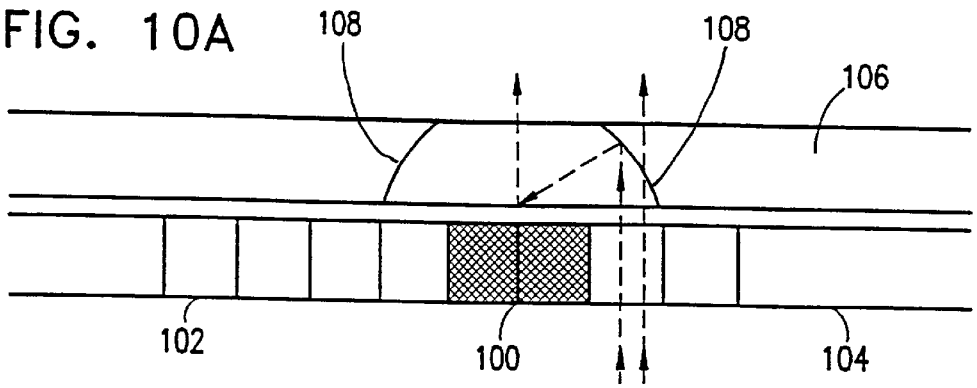
FIGS. 10A–10D show various methods of reducing the effect of seams between LCAs.
Figure 10B:
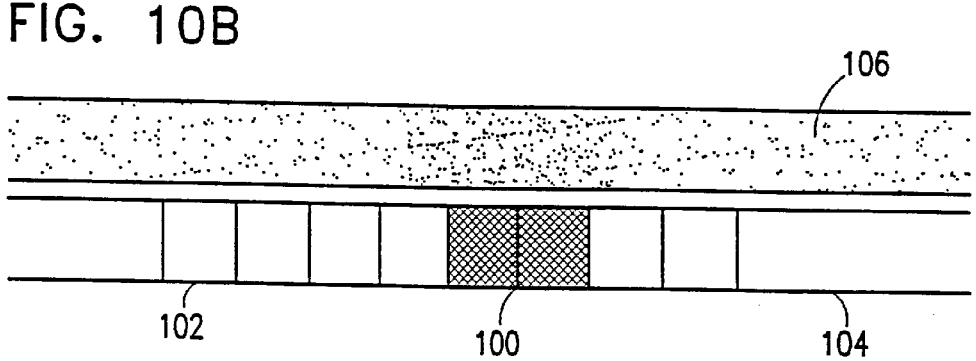
Figure 10C:
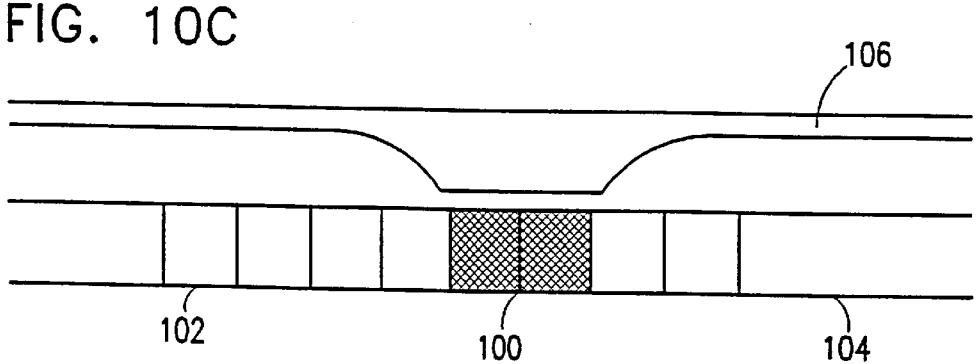
Figure 10D:
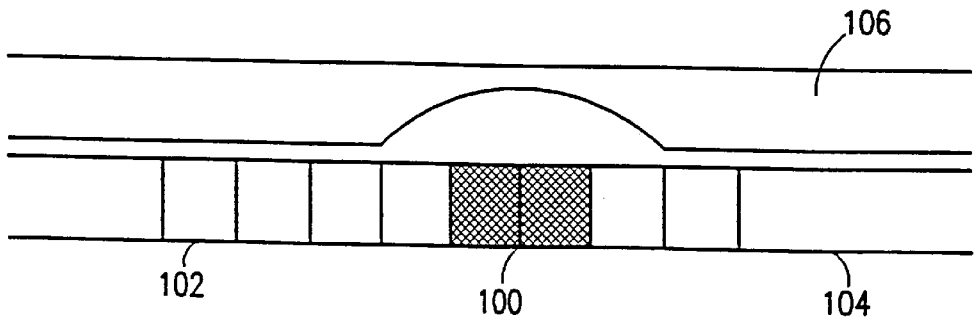

FIGS. 10A–10D show several methods of reducing the edge effects where two LCAs are laterally joined. FIGS. 10A–10D each show a joint 100 between a first LCA 102 and a second LCA 104. A face plate 106 is spaced from the LCAs and is located between the LCAs and the viewer. In a preferred embodiment of the invention, diffuser plate 106 may be the faceplate of the viewer. In FIG. 10A partially reflecting surfaces 108 are embedded in the faceplate which may or may not be a diffuser. These reflecting surfaces increase the amount of light which appears to come from the joint and effectively hide the joint. FIG. 10B schematically shows a face plate in which a diffusing effect is introduced or increased in the region of the joint. Again, the effect of the joint is reduced. FIG. 10C shows a diffuser having increased thickness at the joint which also increases the diffusion thereat, and FIG. 10D shows an increased air gap at the joint, which the present inventors have found also increases the diffusion.

The joints shown in FIGS. 10A–10D are butt joints. However, lap joints can also be used in which case the width of the joint is reduced, but the surface of the LCA is no longer flat. Finally, FIGS. 10A–10D show a single layer of LCA. As indicated above, in a preferred embodiment of the invention, preferably two layers are used for the LCA, and the layers are preferably offset by a fraction of the element of the array to improve the contrast of the array.

It should be understood that the solutions for seams at joints which have been described are generally suitable only for medical imaging viewers, and not for normal applications in which diffusing light over the seam would be objectionable.

The invention has been described with respect to a viewer which has a single LCA across its entire width. In general, especially for larger viewers, multiple LCAs (preferably each having a double layer) would be used side by side. In a preferred embodiment of the invention, separate driver units would be used for each of the side-by-side LCAs.

FIG. 17 shows a preferred embodiment of the invention which utilizes a normally dark LCA in addition to a normally bright LCA or LCA system. An illuminator 110 comprises a light source 112 including a series of lamps, such as fluorescent lamps 114 and a back reflector 116. Thermal isolation 118 such as double layer glass insulation is provided between the lamps and a diffusion film 120. Diffusion film 120 provides more uniform illumination of the BEF and provides efficient reflection for light rays that are reflected by the BEF.

Light which passes through diffusion film 120 is passed through a BEF 122 to a normally dark LCA 124, such as 90° TN LCD with parallel polarizers available from Standish Industries, Lake Mills Wis. to provide light at an angle at which the LCA provides a high on-off ratio for the light (high contrast between dark and bright areas). The normally dark LCA has a relatively high resolution, with LCA pixel elements preferably having a 2.5×2.5 mm size although larger or smaller sizes can be used. LCA 124 is addressed, as described above, so that it is clear in those portions thereof which are under a transparency and dark in those portions which are outside the transparency or the portion thereof which is viewed.

LCA 124 is preferably addressed, as described below, to provide a contrast of about 30:1. A diffuser 126 is preferably spaced by an air gap 125 of 1–10 mm, more preferably by 2–8 mm and most preferably by 5 mm, from the output face of LCA 124. A preferred diffuser is a DFA-20 diffuser manufactured by Minnesota Mining and Manufacturing. Other choices of distance and diffuser can also be used to achieve the removal of dark lines between the bright pixels of LCA 124 and to provide a wider angle of illumination.

A normally bright LCA 128 which may have a relatively low resolution, with pixel size of, for example, 10×10 mm (again, larger or smaller sizes are also useful in carrying out the invention), receives the diffuse illumination. LCA 128 contacts or is closely spaced from diffuser 126. LCA 128 is addressed to provide illumination to the image and to block illumination outside the image.

While the required diffusion achieved by diffuser film 126 could also be achieved by using a film with greater diffusion and reducing or omitting the space, it has been found by the inventors that the total amount of light passing through LCA 128 is increased by using the preferred diffusion scheme. This is caused by the fact that, in general, light polarization is destroyed by a diffuser. Since the light leaving LCA 124 is polarized and that entering LCA 128 must be polarized (such polarization normally being provided by an entrance polarizer which is part of the LCA) diffusion of the light between the two LCAs can cause light loss of up to 50%. By using a smaller amount of actual light diffusion and a space to amplify its effect, the polarization of the light leaving LCA 124 can be largely preserved and the overall efficiency increased by 50%–75% or more. Since high brightness is desired in the bright regions, improved efficiency can be important in a practical transparency viewer. Furthermore, using a low amount of diffusion preserves more of the directionality than using a large amount of diffusion resulting in better contrast.

A further effect of diffusing the light between the LCA layer is to improve the chromaticity of the system as a function of viewing angle. In addition, the diffuser reduces a Moire effect which may be caused by the screen-like nature of the BEF.

FIG. 17 also shows other like numbered features which have been described above and a film clip 250 which can also serve as a sensor of the transparency to aid in the determination of the size of the film.

We claim:

1. A transparency viewing device comprising:
   a faceplate adapted for mounting at least one transparency thereon;
   a backlit passive matrix LCD array comprising a plurality, N, of row electrodes and a plurality, M, of column electrodes separated by liquid crystal material, wherein the intersections of the row and column electrodes define a matrix of M×N pixel elements arranged in N rows and M columns, which pixels can be excited by a voltage difference between the two electrodes intersecting a pixel; and
   a driver which identically electrifies a plurality of row electrodes which excite identical patterns of pixels, and which identically electrifies a plurality of column electrodes which excite identical patterns of pixels, wherein each of said patterns of pixels includes at least one pixel which is to be activated, and
   wherein said voltage difference at each of the pixel elements is an RMS voltage having only one of two values.

2. A transparency viewing device according to claim 1 wherein the ratio of the two values is greater than 3.

3. A transparency viewing divide according to claim 1 wherein the ratio of the two values is greater than 5.

4. A transparency viewing device according to claim 1 wherein the ratio of the two values is greater than 50.

5. A transparency viewing device according to claim 1 wherein one of the values is substantially equal to zero.

6. A transparency viewing device according claim 1 wherein the electrification of at least one of the N electrodes is substantially the same as the electrification of one of the M electrodes.

7. A transparency viewing device according to claim 1 wherein at least some of said N electrodes or said M electrodes are not contiguous.

8. A transparency viewing device according to claim 1 wherein the excitation of the electrodes comprises pulsed voltages.

9. A transparency viewing device according to claim 1 wherein the pixel elements are transparent in the absence of an exciting voltage.

10. A transparency viewing device according to claim 1 and also comprising a second passive LCD array underlying said first array.

11. A transparency viewing device according to claim 1 wherein at least one matrix array comprises a plurality, r, of LC layers and a plurality, r+1, of polarizers, one of the polarizers being located between each adjoining pair of said layers and one polarizer being located at each outside surface of the outer ones of said layers.

12. A transparency viewing device according claim 1 wherein the LCD array is backlighted by a source of light and including a brightness enhancing (BE) device which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles around an off-normal angle far from the normal at which the LCD is not effective to block the light, said BE device being situated between the source and the LCD array.

13. A transparency viewing device according to claim 12 including a light detector which views the array, from an angle within the off-normal range of angles.

14. A transparency viewing device according to claim 1 wherein said passive LCD array is a normally bright LCD array and further comprising a normally dark passive LCD passive array underlying the normally bright array.

15. A transparency viewing device according to claim 1 wherein each of the patterns of pixels also includes at least one pixel which is not to be activated.

16. A transparency viewing device according to claim 1 wherein the row electrodes are electrified in two groups, each group having all those row electrodes which excite identical patterns of pixels.

17. A transparency viewing device according to claim 16 wherein the column electrodes are electrified in two groups, each group having all those column electrodes which excite identical patterns of pixels.

18. A transparency viewing device according claim 1 wherein all of the row electrodes which intersect pixel elements which are to be excited and pixel elements which are not excited are identically electrified and wherein all of the column electrodes which intersect pixel elements which are to be excited and pixel elements which are not excited are identically electrified.

19. A transparency viewing device according to claim 1 wherein the distance between adjoining electrodes is substantially less than the width of the electrodes and further comprising a second passive LCD array underlying said first array.

20. A transparency viewing device according to claim 19 wherein the angular dependence of the transmission of the LCD array is a function of the viewing angle relative to a reference angle and wherein the underlying array is oriented with its reference angle at an angle different from that of the overlying array.

21. A transparency viewing device according to claim 20 wherein the reference angles of the overlying and underlying arrays are oriented at a 180° to each other.

22. A transparency viewing device according to claim 1 wherein the second LCD array comprises a matrix of pixel elements which are offset from the matrix of pixel elements of the overlying array. the angular dependence of the transmission of the LCD array is a function of the viewing angle relative to a reference angle and wherein the underlying array is oriented with its reference angle at an angle different from that of the overlying array.

23. A transparency viewing device according to claim 1 wherein one of the plurality of identically electrified row electrodes and one of the plurality of identically electrified column electrodes has a pattern of pixels including at least one pixel which is not to be activated and wherein one of the plurality of identically electrified row electrodes and one of the plurality of identically electrified column electrodes has a pattern of pixels all of whom are to be activated.

24. A viewing device comprising:
    an overlying LCD matrix array and an underlying matrix array, each array comprising a plurality, N, of row electrodes and a plurality, M, of column electrodes separated by liquid crystal material, wherein the intersections of the row and column electrodes define a matrix of M×N pixel elements arranged in N rows and M columns, and wherein the width of the electrodes is greater than the space between adjacent electrodes; and
    a driver which selectively drives the electrodes thereby to change the optical transmission of the pixel elements, wherein the pixel elements of the overlying and underlying arrays are offset from each other.

25. A viewing device according to claim 24 wherein the angular dependence of the transmission of the LCD array is a function of the viewing angle relative to a reference angle and wherein the underlying array is oriented with its reference angle at an angle different from that of the overlying array.

26. A transparency viewing device comprising:

a faceplate adapted for mounting at least one transparency thereon;

an LCD array defining an array of pixels;

a driver which selectively varies the transparency of the pixels;

a source of back lighting for the LCD array;

a brightness enhancing (BE) device which accepts light at a relatively large angle from the normal to the LCD array and which transmits the major portion of the accepted light through a relatively limited angle around the normal to the LCD array for which the LCD is substantially effective to selectively block the light and a lesser portion of the light at a range of angles around an off-normal angle far from the normal at which the LCD is not effective to block the light, said BE device being situated between the source and the LCD array; and a light detector which views the array, from an angle within the off-normal range of angles.

27. A transparency viewing device according to claim 26 wherein the detector is an imaging detector.

28. A transparency viewing device comprising:

a viewing surface;

a normally bright LCD array underlying the viewing surface;

a normally dark LCD array underlying the normally bright LCD array; and a source of backlighting underlying the normally dark LCD array.

29. A transparency viewing device according to claim 28 wherein the normally bright LCD array and the normally dark LCD array are passive LCD arrays.

30. A transparency viewing device according to claim 28 and further comprising a diffuser intermediate the normally bright and normally dark arrays and spaced from the normally dark LCD array.

31. A transparency viewing device according to claim 30 wherein said diffuser is spaced by 1–10 mm from the normally dark LCD.

32. A transparency viewing device according to claim 30 wherein said diffuser is spaced by 2–8 mm from the normally dark LCD.

33. A transparency viewing device according to claim 30 wherein said diffuser is spaced by approximately 5 mm from the normally dark LCD.

34. A transparency viewing device according to claim 30 wherein the space is air filed.

35. A viewing device according to claim 30, wherein the diffuser substantially preserves the polarization of light passing through it.

36. A viewing device according to claim 28, wherein the normally bright and normally dark LC arrays are matrix arrays having different resolutions.

37. A transparency viewing device comprising:

a faceplate adapted for mounting at least one transparency thereon;

a source of back lighting;

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies, using a non-scanning mode, row electrodes which excite identical patterns of pixels, and which identically electrifies, using a non-scanning mode, column electrodes which excite identical patterns of pixels.

38. A transparency viewing device according to claim 37, wherein each of said patterns of pixels includes at least one pixel which is to be activated and one pixel which is not to be activated.

39. A transparency viewing device according to claim 37 wherein one of the plurality of identically electrified row electrodes and one of the plurality of identically electrified column electrodes has a pattern of pixels including at least one pixel which is not to be activated and wherein one of the plurality of identically electrified row electrodes and one of the plurality of identically electrified column electrodes has a pattern of pixels all of whom are to be activated.

40. A transparency viewing device according to claim 37 wherein the row electrodes are electrified in two groups, each group having all those row electrodes which excite identical patterns of pixels.

41. A transparency viewing device according to claim 40 wherein the column electrodes are electrified in two groups, each group having all those column electrodes which excite identical patterns of pixels.

42. A transparency viewing device according claim 37 wherein all of the row electrodes which intersect pixel elements which are to be excited and pixel elements which are not excited are identically electrified and wherein all of the column electrodes which intersect pixel elements which are to be excited and pixel elements which are not excited are identically electrified.

43. A transparency viewing device according claim 37 wherein said voltage difference at each of the pixel elements is an RMS voltage difference having only one of two values.

44. A transparency viewing device according to claim 43 wherein the ratio of the two values is greater than 3.

45. A transparency viewing device according to claim 43 wherein the ratio of the two values is greater than 5.

46. A transparency viewing device according to claim 43 wherein the ratio of the two values is greater than 50.

47. A transparency viewing device according to claim 43 wherein one of the values is substantially equal to zero.

48. A transparency viewing device according to claim 37 wherein the electrification of at least one of the N electrodes is substantially identical to the electrification of one of the M electrodes.

49. A transparency viewing device according to claim 37 wherein at least some of the identically electrified row electrodes are not contiguous.

50. A transparency viewing device according to claim 37 wherein at least some of the identically electrified column electrodes are not contiguous.

51. A transparency viewing device according to claim 37 wherein the excitation of the electrodes comprises pulsed voltages.

52. A transparency viewing device according to claim 37 wherein the pixel elements are transparent in the absence of an exciting voltage.

53. A transparency viewing device according to claim 37 wherein the distance between adjoining electrodes is substantially less than the width of the electrodes and further comprising a second passive LCD array underlying said first array.

54. A transparency viewing device according to claim 53 wherein the second LCD array comprises a matrix of pixel elements which are offset from the matrix of pixel elements of the overlying array.

55. A transparency viewing device according to claim 54 wherein the angular dependence of the transmission of the LCD array is a function of the viewing angle relative to a reference angle and wherein the underlying array is oriented with its reference angle at an angle different from that of the overlying array.

56. A transparency viewing device according to claim 55 wherein the reference angles of the overlying and underlying arrays are oriented at a 180° to each other.

57. A transparency viewing device according to claim 37 and including a brightness enhancing (BE) device which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles around an off-normal angle far from the normal at which the LCD is not effective to block the light, said BE device being situated between the source and the LCD array.

58. A transparency viewing device according to claim 57, and including a light detector which views the array from an angle within the off-normal range of angles.

59. A transparency viewing device according to claim 37 wherein said passive LCD array is a normally bright LCD array and further comprising a normally dark passive LCD passive array underlying the normally bright array.

60. A transparency viewing device comprising:
a faceplate adapted for mounting at least one transparency thereon;
a source of back lighting;
a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and
a driver which identically electrifies at least one row electrode and one at least one column electrode.

61. A transparency viewing device according to claim 60 wherein the at least one row electrode includes a plurality of row electrodes.

62. A transparency viewing device according to claim 61 wherein at least some of the identically electrified row electrodes are not contiguous.

63. A transparency viewing device according to claim 62 wherein at least some of the identically electrified column electrodes are not contiguous.

64. A transparency viewing device according to claim 60 wherein the at least one column electrode includes a plurality of column electrodes.

65. A transparency viewing device according to claim 64 wherein at least some of the identically electrified column electrodes are not contiguous.

66. A transparency viewing device according to claim 60 wherein the excitation of the electrodes comprises pulsed voltages.

67. A transparency viewing device according to claim 60 wherein the pixel elements are transparent in the absence of an exciting voltage.

68. A transparency viewing device according to claim 60 wherein the distance between adjoining electrodes is substantially less than the width of the electrodes and further comprising a second passive LCD array underlying said first array.

69. A transparency viewing device according to claim 68 wherein the second LCD array comprises a matrix of pixel elements which are offset from the matrix of pixel elements of the overlying array.

70. A transparency viewing device according to claim 68 wherein the angular dependence of the transmission of the LCD array is a function of the viewing angle relative to a reference angle and wherein the underlying array is oriented with its reference angle at an angle different from that of the overlying array.

71. A transparency viewing device according to claim 70 wherein the reference angles of the overlying and underlying arrays are oriented at a 180° to each other.

72. A transparency viewing device cording to claim 60 and including a brightness enhancing (BE) device which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles around an off-normal angle far from the normal at which the LCD is not effective to block the light, said BE device being situated between the source and the LCD array.

73. A transparency viewing device according to claim 72, and including a light detector which views the array from an angle within the off-normal range of angles.

74. A transparency viewing device according to claim 60 wherein said passive LCD array is a normally bright LCD array and further comprising a normally dark passive LCD passive array underlying the normally bright array.

75. A viewing device comprising:
a viewing surface;
a first liquid crystal (LC) matrix array underlying the viewing surface;
a second LC matrix array underlying the first LC array; and
a source of backlighting underlying the second LC array, wherein the first and second matrix arrays have different resolutions.

76. A viewing device according to claim 75 wherein the first and second LC arrays are passive LC arrays.

77. A viewing device according to claim 75, wherein the viewing surface is adapted for mounting a transparency thereon.

78. A viewing device according to claim 74, wherein the normally bright and normally dark LC arrays are matrix arrays having different resolutions.

79. A viewing device comprising:
a faceplate adapted for mounting at least one transparency thereon;
a source of back lighting;
a passive matrix LC array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and
a driver which electrifies p groups of row electrodes, each group containing a plurality of row electrodes which excite identical patterns of pixels, and which electrifies, q groups of column electrodes, each group containing a plurality of column electrodes which excite identical patterns of pixels, wherein at least one of said p groups and at least one of said q groups contains a plurality of electrodes having a pattern of pixels including at least one pixel which is to be activated and one pixel which is not to be activated;

all the electrodes in a group are identically electrified;

$2 \leq p$, $2 < q$ and at least one of p and q are greater than 2, and at least one some of the identically electrified row electrodes are not contiguous.

80. A viewing device according to claim 79, wherein p=q=3.

81. A viewing device comprising:

a faceplate adapted for mounting at least one transparency thereon;

a source of back lighting;

a passive matrix LC array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which electrifies, using a non-scanning mode, p groups of row electrodes, each group containing all those row electrodes which excite identical patterns of pixels, and which electrifies, q groups of column electrodes, each group containing all those column electrodes which excite identical patterns of pixels, wherein all the electrodes in a group are identically electrified; and $2 \leq p$, $2 \leq q$ and at least one of p and q are greater than 2.

82. A viewing device according to claim 81 wherein at least one of said p groups and at least one of said q groups contains a plurality of electrodes having a pattern of pixels including at least one pixel which is to be activated and one pixel which is not to be activated.

83. A viewing device according to claim 82, wherein p=q=3.

84. A viewing device according to claim 82 wherein at least some of the identically electrified column electrodes are not contiguous.

85. A viewing device according to claim 81, wherein p=q=3.

86. A liquid crystal array comprising:

an input polarizer;

an array of addressable liquid crystal elements;

an output polarizer; and a diffuser situated between the liquid crystal elements and the output polarizer.

87. A liquid crystal array accor(1in(i to claim 96 wherein the diffuser is spaced from the liquid crystal elements.

88. A liquid crystal array according to claim 87 wherein the diffuser is spaced by 1–10 mm from the liquid crystal elements.

89. A liquid crystal array according to claim 87 wherein the diffuser is spaced by 2–8 mm from the liquid crystal elements.

90. A liquid crystal array according to claim 87 wherein the diffuser is spaced by approximately 5 mm from the liquid crystal elements.

91. A liquid crystal array according to claim 87 wherein the space is air filed.

92. A transparency viewing device comprising:

a faceplate adapted for mounting at least one transparency thereon;

a source of back lighting;

a passive matrix LCD array situated intermediate the source of back lighting and the faceplate and comprising a plurality, N, of row electrodes and a plurality, M, of column electrodes separated by liquid crystal material, wherein the intersections of the row and column electrodes define a matrix of N×M pixel elements arranged in N rows and M columns, which pixels can be excited by a voltage difference between the two electrodes intersecting a pixel; and a driver which identically electrifies, all those row electrodes which excite identical patterns of pixels, and which identically electrifies all those column electrodes which excite identical patterns of pixels.

93. A transparency viewing device according to claim 92, wherein each of said patterns of pixels includes at least one pixel which is to be activated and one pixel which is not to be activated.

94. A transparency viewing device according to claim 92 wherein one of the plurality of identically electrified row electrodes and one of the plurality of identically electrified column electrodes has a pattern of pixels including at least one pixel which is not to be activated and wherein one of the plurality of identically electrified row electrodes and one of the plurality of identically electrified column electrodes has a pattern of pixels all of whom are to be activated.

95. A transparency viewing device according to claim 92 wherein the row electrodes are electrified in two groups, each group having all those row electrodes which excite identical patterns of pixels.

96. A transparency viewing device according to claim 95 wherein the column electrodes are electrified in two groups, each group having all those column electrodes which excite identical patterns of pixels.

97. A transparency viewing device according claim 92 wherein all of the row electrodes which intersect pixel elements which are to be excited and pixel elements which are not excited are identically electrified and wherein all of the column electrodes which intersect pixel elements which are to be excited and pixel elements which are not excited are identically electrified.

98. A transparency viewing device according claim 92 wherein said voltage difference at each of the pixel elements is an RMS voltage difference having only one of two values.

99. A transparency viewing device according to claim 98 wherein the ratio of the two values is greater than 3.

100. A transparency viewing device according to claim 98 wherein the ratio of the two values is greater than 5.

101. A transparency viewing device according to claim 98 wherein the ratio of the two values is greater than 50.

102. A transparency viewing device according to claim 98 wherein one of the values is substantially equal to zero.

103. A transparency viewing device according to claim 92 wherein the electrification of at least one of the N electrodes is substantially identical to the electrification of one of the M electrodes.

104. A transparency viewing device according to claim 92 wherein at least some of the identically electrified row electrodes are not contiguous.

105. A transparency viewing device according to claim 92 wherein at least some of the identically electrified column electrodes are not contiguous.

106. A transparency viewing device according to claim 92 wherein the excitation of the electrodes comprises pulsed voltages.

107. A transparency viewing device according to claim 92 wherein the pixel elements are transparent in the absence of an exciting voltage.

108. A transparency viewing device according to claim 92 wherein the distance between adjoining electrodes is substantially less than the width of the electrodes and further comprising a second passive LCD array underlying said first array.

109. A transparency viewing device according to claim 108 wherein the second LCD array comprises a matrix of pixel elements which are offset from the matrix of pixel elements of the overlying array.

110. A transparency viewing device according to claim 109 wherein the angular dependence of the transmission of the LCD array is a function of the viewing angle relative to a reference angle and wherein the underlying array is oriented with its reference angle at an angle different from that of the overlying array.

111. A transparency viewing device according to claim 110 wherein the reference angles of the overlying and underlying arrays are oriented at a 180° to each other.

112. A transparency viewing device according to claim 92 and including a brightness enhancing (BE) device which accepts light at a relatively large angle from the normal to the LC device and which transmits the major portion of the accepted light through a relatively limited angle around the normal to the LCD array for which the LCD is substantially effective to selectively block the light and a lesser portion of the light at a range of angles around an off-normal angle far from the normal at which the LCD is not effective to block the light, said BE device being situated between the source and the LCD array.

113. A transparency viewing device according to claim 112, and including a light detector which views the array from an angle within the off-normal range of angles.

114. A transparency viewing device according to claim 92 wherein said passive LCD array is a normally bright LCD array and further comprising a normally dark passive LCD passive array underlying the normally bright array.

* * * * *